(12) United States Patent
Bailey et al.

(10) Patent No.: US 9,323,826 B2
(45) Date of Patent: Apr. 26, 2016

(54) METHODS, APPARATUS AND SOFTWARE FOR ANALYZING THE CONTENT OF MICRO-BLOG MESSAGES

(71) Applicant: EBH ENTERPRISES INC., New York, NY (US)

(72) Inventors: Edward J. Bailey, New York, NY (US); Samuel L. Hendel, New York, NY (US); Jeffrey D. Kinsey, Brooklyn, NY (US); Richard J. Schiller, Westbury, NY (US)

(73) Assignee: EBH Enterprises Inc., New York, NY (US)

( * ) Notice: Subject to any disclaimer, the term of this patent is extended or adjusted under 35 U.S.C. 154(b) by 0 days.

(21) Appl. No.: 14/269,705

(22) Filed: May 5, 2014

(65) Prior Publication Data

US 2014/0358929 A1    Dec. 4, 2014

Related U.S. Application Data

(63) Continuation of application No. 12/797,487, filed on Jun. 9, 2010, now Pat. No. 8,719,302.

(60) Provisional application No. 61/185,577, filed on Jun. 9, 2009.

(51) Int. Cl.
  *G06F 17/30* (2006.01)
  *G06Q 50/00* (2012.01)

(52) U.S. Cl.
  CPC .... *G06F 17/30598* (2013.01); *G06F 17/30705* (2013.01); *G06F 17/30861* (2013.01); *G06Q 50/01* (2013.01)

(58) Field of Classification Search
  CPC ................................................ G06F 17/30528
  USPC ........................ 707/607, 687, 790, 813, 821
  See application file for complete search history.

(56) References Cited

U.S. PATENT DOCUMENTS 6,121,885 A *  9/2000  Masone ................. G08B 17/10
                                                    340/286.05
8,010,664 B2 *  8/2011  Firminger ......... G06F 17/30528
                                                    705/2

(Continued)

FOREIGN PATENT DOCUMENTS

JP   2005-339368 A   12/2005
JP   2009-3888 A    1/2009

(Continued)

OTHER PUBLICATIONS

Philip Sheldrake, The Social Web Analytics eBook 2008, Jul. 1, 2008, 99 pages, http://www.socialwebanalytics.com, accessed Mar. 6, 2015.

(Continued)

*Primary Examiner* — Sana Al Hashemi
(74) *Attorney, Agent, or Firm* — Husch Blackwell LLP

(57) ABSTRACT

Methods, systems and software are described for analyzing micro-blog messages to detect activity of interest. The system includes a clusterer for clustering micro-blog messages received over a first period of time, a classifier for scoring the clustered messages; a knowledge base, a rule generator for generating classification rules from the knowledge base; and a matcher for matching the scored messages to information requests. Methods for operating the system and its components are described.

25 Claims, 33 Drawing Sheets

(56) References Cited

U.S. PATENT DOCUMENTS

| | | | |
|---|---|---|---|
| 2006/0069589 | A1 | 3/2006 | Nigam et al. |
| 2006/0095521 | A1 | 5/2006 | Patinkin |
| 2007/0260635 | A1 | 11/2007 | Ramer et al. |
| 2008/0071728 | A1 | 3/2008 | Lim |
| 2008/0086363 | A1 | 4/2008 | Kass et al. |
| 2009/0138415 | A1* | 5/2009 | Lancaster ............... G06N 5/04 706/11 |

FOREIGN PATENT DOCUMENTS

| | | |
|---|---|---|
| JP | 2009-48441 A | 3/2009 |
| WO | 2007004332 A1 | 4/2007 |

OTHER PUBLICATIONS

Gökhan Coskun, Ralf Heese, Markus Luczak-Rösch, Radoslaw Oldakowski, Ralph Schäfermeir and Olga Streibel, Towards Corporate Semantic Web: Requirements and Use Cases, Technical Report TR-B-08-09, Aug. 1, 2008, 74 pages, Freie Universität Berlin, Berlin, Germany, http://ftp.mi.fu-berlin.de/reports/tr-b-08-09.pdf, accessed Mar. 6, 2015.

Ahmad El Sayed, Contributions in Knowledge Discovery from Textual Data, Thesis, Apr. 28, 2008, 187 pages, Université Lumière Lyon 2.

Sravana Reddy, Part of Speech Induction using Non-negative Matrix Factorization, May 2009, 46 pages, http://worldwide.espacenet.com/publicationDetails/citedDocuments?CC=WO&NR=2010144618A1&KC=AL&FT=D&ND=&date=20101216&Db=&locale=en_EP, accessed May 20, 2015.

Yasuke Iwai, Adam Jatowt, and Katsumi Tanaka, Supporting finding read-valuable articles in microblogs, the First Forum on Data Engineering and Information Management, 6 pages, May 9, 2009, The Institute of Electronics, Information and Communication Engineers Data Engineering Technical Group, Japan.

* cited by examiner

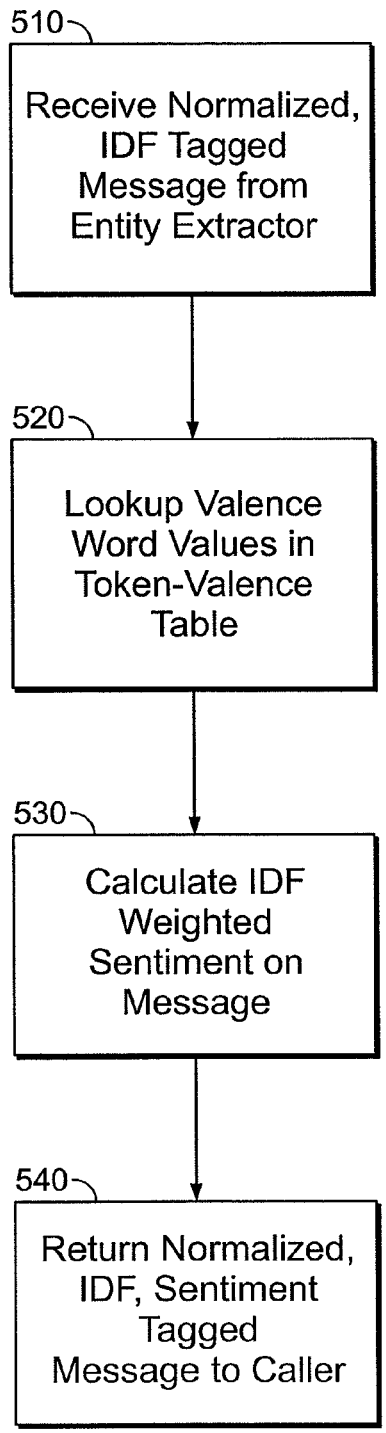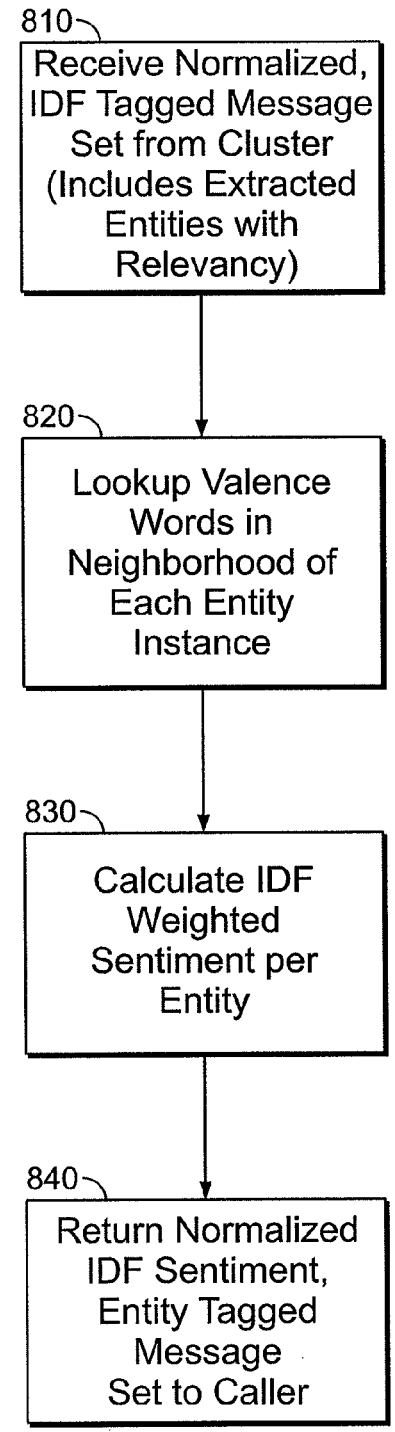
FIG. 5
FIG. 8

My Account

Welcome, joe@trader.com || Settings || Log Out

Search | Alert | History | Account
1512  1514  1516  1518

| Field | Value |
|---|---|
| Account: | {Account Number} |
| Last/First Name: | {User's Last Name}  {User's First Name}  [MI] |
| Firm Name: | {Account Firm Name}  {Account Firm #} |
| Group Name: | {Account Group Name}  {Account Group #} |
| Password: | {User's Password}  {Confirm Password} |
| Address: | {User's Address Line #1}  {User's Address Country}  {User's Address City} |
|  | {User's Address Line #2}  {User's Address State}  {User's Address Zip} |
| Contact Phone: | {User's Office Phone}  {User's Fax}  {User's Mobile Phone} |
| Contact Email: | {User's Office Alert Email}  {User's Administrative Email} |
| Instant Messaging: | {User's IM Handle} |

[Lookup]   [Entitlements]   [Delete]

| Alert Name | Sentiment | Acceleration | Summary | Relevance | Date - Time |
|---|---|---|---|---|---|
| Oil Portfolio | Gulf Refineries | Viral | Gulf Hurricanes | 98% | 2009-09-10 - 09:58:01 |
| Phama Portfolio | Drug Trial Failure | Viral | FDA Drug Approval | 96% | 2009-09-10 - 09:40:15 |
| Constr Portfolio | Recession Eases | Conversational | Economic Recovery | 90% | 2009-09-10 - 09:35:23 |
| Oil Portfolio | Gulf Rigs | Fade | Oil Production | 95% | 2009-09-10 - 09:20:19 |

| LOGO | | Welcome, joe@trader.com ¦ Settings ¦ Log Out |
|---|---|---|
| | Search ¦ Alert ¦ History ¦ Account | |

Account Login

1550

Log In (Customer ID)  [{Account Number}]
Remember Me  [X]
Password  [{User's Password}]
Start Page  [Quick Search] [X] [Research]   [ ] Alerts

Security Notice

Log In
On the login screen, we will never ask you for any personal information other than your Account Number and Password.

E-Mails
We will never ask you to send us personal information through e-mail. If you receive an e-mail appearing or claiming to be from any application which appears to ask for personal information, please do not respond to the message.

If you believe that you may have provided personal information in response to such an e-mail, or on a website or pop-up window linked to such an e-mail, please call Customer support right away at: 1-800-NNN-NNNN

[Log In] 1561    [My Account] 1562    [Contact Us] 1563    [Lost Password] 1564

Search ¦ Alerts ¦ History ¦ Account
Contact Us ¦ Legal

FIG. 15C

LOGO | Welcome, joe@trader.com || Settings || Log Out

Search | Alert | History | Account

Alert Criteria

Select Sample Interval: — 1573
- IntraDay    ○ InterDay
- ○ Weekly    ○ Quarterly
- ○ Semiannually    ○ Annually Apply to Alerts:

[Oil Portfolio]

```
<all alerts {default}>
Oil Portfolio
AIG Subordinate Tickers
Balanced Basket To Target
Constr Portfolio
Pharma Portfolio
```

1571

Relevancy & Thresholds

Minimum Relevancy of Incoming
Data to the Alert Criteria
- ● Very High (95% -to- 100%)
- ○ High (90% -to- 95%)
- ○ Medium (80% -to- 90%)
- ○ Low (60% -to- 80%)

1575

Sentiment Threshold
- ⇓ ○ Very Negative
- ↘ ○ Moderately Negative
- ↗ ○ Slightly Negative
- ● No Threshold
- ↘ ○ Slightly Positive
- ↗ ○ Moderately Positive
- ⇑ ○ Very Positive 1576
1577

Degree Difference of Buzz from Norm:
- ○ low    ● Medium    ○ High

1578

| Alert Name | Sentiment | Acceleration | Summary | Relevance | Date - Time |
|---|---|---|---|---|---|
| Oil Portfolio | ⇑ Gulf Refineries | Viral | Gulf Hurricanes | 98% | 2009-09-10 - 09:58:01 |
| Phama Portfolio | ⇓ Drug Trial Failure | Viral | FDA Drug Approval | 96% | 2009-09-10 - 09:40:15 |
| Constr Portfolio | ⇑ Recession Eases | Conversational | Economic Recovery | 90% | 2009-09-10 - 09:35:23 |
| Oil Portfolio | ⇓ Gulf Rigs | Fade | Oil Production | 95% | 2009-09-10 - 09:20:19 |

FIG. 15D

LOGO

Welcome, joe@trader.com | Settings | Log Out

Search | Alert | History | Account

Alert Name: Oil Portfolio  Delivery Method: Instant Messenger: ☒ 📇 Set Defaults  [Delete]  Help

| Criteria | Criteria Type | Comment | Actions | |
|---|---|---|---|---|
| HES US Equity | Ticker (Bloomberg) | Bloomberg Ticker | ☒ Delete | ☑ Edit | ⊞ Next | 🔧 |
| XOM US Equity | Ticker (Bloomberg) | Bloomberg Ticker | ☒ Delete | ☑ Edit | ⊞ Next | 🔧 |
| "oil reserves" | Free text | Some desired phrase | ☒ Delete | ☑ Edit | ⊞ Next | 🔧 |
| Oil & Gas Refining & Marketing | Industry (GICS) | GICS Sub-Industry: 10102030 | ☒ Delete | ☑ Edit | ⊞ Next | |

10 Energy
1010 Energy
101010 Energy Equipment & Services
10101010 Oil & Gas Drilling
10101020 Oil & Gas Equipment & Services
101020 Oil, Gas & Consumable Fuels
10102010 Integrated Oil & Gas
10102020 Oil & Gas Exploration & Production
10102030 _Oil & Gas Refining & Marketing_
10102040 Oil & Gas Storage & Transportation
10102050 Coal & Consumable Fuels Companies
Financial Topics
Geography
Industry
 - GICS
 - NAICS
 - SIC
People
New Topics
Social Media Topics
Ticker _(default)_
 Bloomberg
 Reuters
Free Text

Comment: {Type a Comment to the Data Quality Team}    [Submit] ⊗

Spreadsheet Location: My Documents\Portfolio.xlsx    [Import] ⊙

[Next]

| Alert Name | Sentiment | Acceleration | Summary | Relevance | Date - Time |
|---|---|---|---|---|---|
| Oil Portfolio | Gulf Refineries ⇨ | Viral | Gulf Hurricanes | 98% | 2009-09-10 - 09:58:01 |
| Phama Portfolio | Drug Trial Failure ⇩ | Viral | FDA Drug Approval | 96% | 2009-09-10 - 09:40:15 |
| Constr Portfolio | Recession Eases ⇧ | Conversational | Economic Recovery | 90% | 2009-09-10 - 09:35:23 |
| Oil Portfolio | Gulf Rigs ⇨ | Fade | Oil Production | 95% | 2009-09-10 - 09:20:19 |

FIG. 15F

LOGO | Welcome, joe@trader.com | Settings | Log Out

Search | Alert | History | Account

Search *Research Inquiry*

[Advanced] 1591  [Research] 1592  [Help] 1593

Bloomberg Tickers
- Companies
- Financial Topics
- Geography
- Industry
  - GICS
  - NAICS
  - SIC
- People
- New Topics
- Social Media Topics
- Ticker *{default}*
  - Bloomberg
  - Reuters
- Free Text

| Alert Name | Sentiment | Acceleration | Summary | Relevance | Date - Time |
|---|---|---|---|---|---|
| Oil Portfolio | ⇨ Gulf Refineries | Viral | Gulf Hurricanes | 98% | 2009-09-10 - 09:58:01 |
| Phama Portfolio | ⇨ Drug Trial Failure | Viral | FDA Drug Approval | 96% | 2009-09-10 - 09:40:15 |
| Constr Portfolio | ⇧ Recession Eases | Conversational | Economic Recovery | 90% | 2009-09-10 - 09:35:23 |
| Oil Portfolio | ⇨ Gulf Rigs | Fade | Oil Production | 95% | 2009-09-10 - 09:20:19 |

FIG. 15G

| Alert Name | Sentiment | | Acceleration | Summary | Relevance | Date - Time |
|---|---|---|---|---|---|---|
| Oil Portfolio | Gulf Refineries | ⇨ | Viral | Gulf Hurricanes | 98% | 2009-09-10 - 09:58:01 |
| Phama Portfolio | Drug Trial Failure | ⇨ | Viral | FDA Drug Approval | 96% | 2009-09-10 - 09:40:15 |
| Constr Portfolio | Recession Eases | ⇧ | Conversational | Economic Recovery | 90% | 2009-09-10 - 09:35:23 |
| Oil Portfolio | Gulf Rigs | ⇨ | Fade | Oil Production | 95% | 2009-09-10 - 09:20:19 |

1610

| Alert Name | Sentiment | | Acceleration | Summary | Relevance | Date - Time |
|---|---|---|---|---|---|---|
| Oil Portfolio | Gulf Refineries | ⇨ | Viral | Gulf Hurricanes | 98% | 2009-09-10 - 09:58:01 |
| Phama Portfolio | Drug Trial Failure | ⇨ | Viral | FDA Drug Approval | 96% | 2009-09-10 - 09:40:15 |
| Constr Portfolio | Recession Eases | ⇧ | Conversational | Economic Recovery | 90% | 2009-09-10 - 09:35:23 |
| Oil Portfolio | Gulf Rigs | ⇨ | Fade | Oil Production | 95% | 2009-09-10 - 09:20:19 |

| Analysis Interval | Interval Duration | Begin Date - Time | End Date - Time | Relevance |
|---|---|---|---|---|
| Interday | 5 minute | 2005-08-24 - 14:52:00 | 2005-08-24 - 15:16:00 | Very High |

Intraday
Interday
Weekly
Quarterly
Semiannually
Annually

*Intraday:*
1 minutes
5 minutes
10 minutes
30 minutes
1 hours
4 hours
*Interday:*
8 hours
12 hours
*Weekly:*
5 days
7 days
*Quarterly:*
3 months
*Semiannually:*
6 months
12 months
*Annually:*
1 year

1650

Very High (95% -to- 100%)
High (90% -to- 95%)
Medium (80% -to- 90%)
Low (60% -to- 80%)

Welcome, joe@trader.com | Settings | Log Out
Search | Alert | History | Account
*Interval Specification*

△ Interval    △ Scale    ⊕ Redraw — 1652

```
Companies
Financial Topics
Geography
Industry
   -GICS
   -NAICS
   -SIC
People
New Topic
Social Media Topics
Tickler (Default)
   Bloomberg
   Reuters
Free Text
```

FIG. 18A

```
GICS
Energy
Materials
Industrials
   Capital Goods
   Transportation
Consumer Discretionary
Automobiles and Components
   Consumer Durables and Apparel
   Retailing
Consumer Staples
Health Care
Financials
   Banks
   Diversified Financials
   Insurance
   Real Estate
```

FIG. 18B

```
GICS
OIL|
Oil Equipment & Services
Integrated Oil & Gas
Exploration & Production
Alternative Fuels
Renewable Energy
```

FIG. 18C

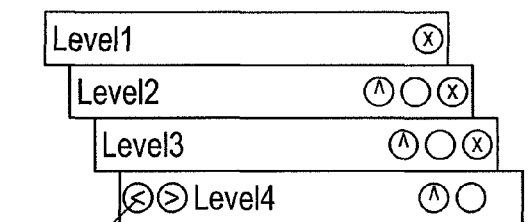

Clicked    FIG. 18D

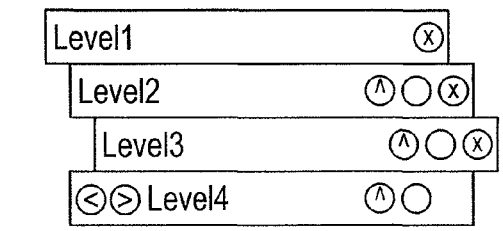

FIG. 18E

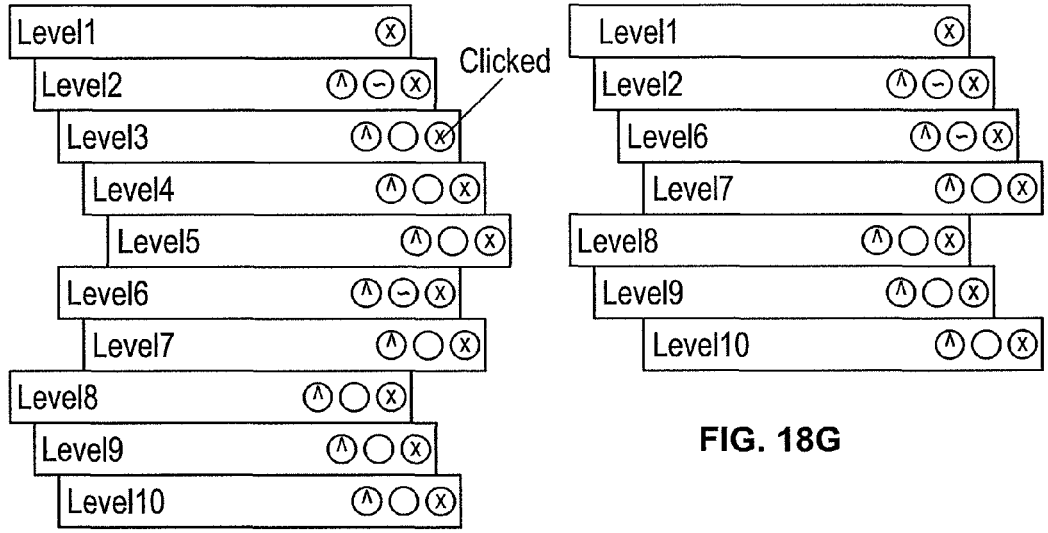
FIG. 18F
FIG. 18G
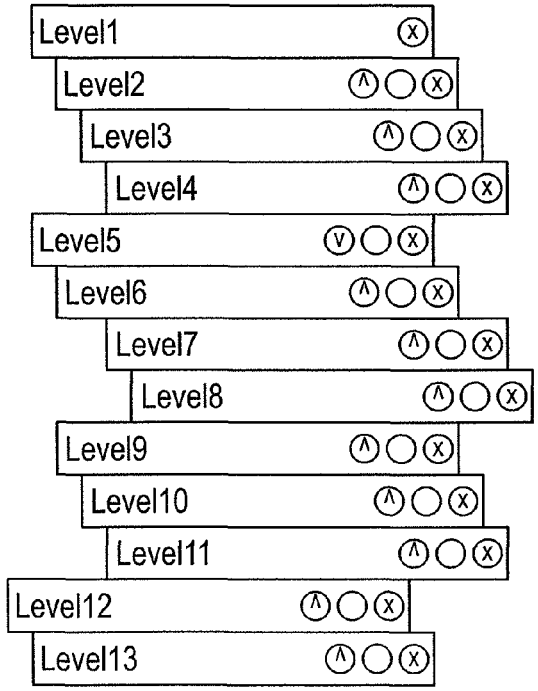
Level4 v ( Level8 * Level11 ) * Level13
FIG. 18H

METHODS, APPARATUS AND SOFTWARE FOR ANALYZING THE CONTENT OF MICRO-BLOG MESSAGES

CROSS-REFERENCE TO RELATED APPLICATION

This application is a continuation of application Ser. No. 12/797,487, filed on Jun. 9, 2010 which application claims benefit of the filing date of provisional application Ser. No. 61/185,577, filed Jun. 9, 2009 for "Systems and Methods for Customer-Relevant Data Delivery and Analysis," the entire contents of which applications are hereby incorporated by reference herein.

COPYRIGHT NOTICE

A portion of the disclosure of this patent document consists of material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND

This relates to micro-blogs and, in particular, to methods, apparatus and software for analyzing the content of micro-blogs.

In the history of the internet, there has never before been an open, searchable means of short-form communication. Predecessors to micro-blogging include: instant messaging, chat rooms, and bulletin boards. However, short form communication in these contexts was always two-way (i.e., one was saying something in response to something else or about a pre-determined topic). Micro-blogging, in contrast, is a one-to-many short form of social communication that is often outside of two-way back-and-forth conversation or topic-centric threaded discussion. Micro-blogging enables people to communicate via "lifestreaming." This involves sharing thoughts, opinions and observations that are correlated to their real-life experience and conveyed in an online setting.

Additionally, micro-blogging exists in a completely open environment where anyone can discover it. The openness of the data set fosters the possibility of exponential volume growth in conversations about areas of social importance. This "viral" nature of micro-blogging is further promoted by social networking and social sharing features that are integrated into most micro-blogging platforms. These tools make it possible for users to designate which other users' content they'd like to receive (in, the case of Twitter, this process is called "following.") Other features on micro-blogging platforms encourage users to share desirable content, expand on it, and redistribute messages in a way that makes them far-reaching.

The viral nature of the data set is the central reason why micro-blogging generated information anomalies can have such a great degree of influence over the online information landscape. Any one piece of micro-blogging content has the capacity to "go viral" and, as a result, affect society just as a mainstream news story would. Furthermore, micro-blogging is an authentic means of self-expression that exists outside of the context of a survey or an interview. This makes an individual's postings, and what they share akin to a continuous consumer survey. Additionally, micro-blogging equips all users with the capacity to be "citizen journalists," such that they can be the first to report events happening around them via their smart-phones or other devices linked to the internet. In summary, Micro-blogging stands as an unparalleled intersection of consumer research and the emerging news-cycle and is, therefore, a uniquely valuable data-set for financial services and other professional end users.

The online social media sphere has achieved critical mass and reached mainstream acceptance. According to the Web analyst Comscore, 64 percent, or 122 million individuals of the 192 million unique US Internet users in February 2009, visited one or more social networking sites, in the process reading, publishing, or responding to posts. In only 12 months, the casual micro-blogging site Twitter saw the number of its users increase by 1085%. The social web, which began as a fad for college students, is now ubiquitous with use spanning all age groups. Demonstrating this is the fact that 38% of Facebook users are over the age of 35, the average blogger is 37, and the median age of Twitter users is 31.

Within this social media landscape, micro-blogging is one of the most prominent and fastest growing user behaviors. While Twitter is the international leader, there are over 111 micro-blogging sites across the world in many different languages. These services include Google Buzz, Tumblr and Plurk. Along with these niche social media platforms, large social networking websites like Facebook, MySpace, and LinkedIn have their own micro-blogging features that are often called "status updates." Posting thoughts and updates about one's life is becoming central to the culture of these larger social networking platforms.

In addition to being mainstream and far-reaching, Twitter and micro-blogging services are also being leveraged in ways that have a dramatic effect on society. For example, Twitter is said to have been a major contributor to the Iranian election uprising. In this case, the service enabled the public to share thoughts with each other in real-time and gather around a central cause. This puts forth further proof that Twitter and other micro-blogging sites are tools with enormous importance and societal power.

Social media outlets are often the first public places where this information is published. The exploding lexicon of virtual "watercooler" talk occurring on the myriad of online user-generated destinations, such as Facebook, MySpace and Twitter, has created an entirely new and relevant user feedback loop containing real-time sentiment and activity trends of the general public. These noticeable trends occur in the online publishing collective well-before the related stories or events are covered and reported by traditional off-line and online news sources. Below are several recent examples of this phenomenon:

When Apple CEO and Founder Steve Jobs' obituary was mistakenly published online, the resulting online buzz is reported to have adversely affected Apple's stock price.

When a major earthquake hit China's Sichuan Province on May 12, 2008, Twitter users in China reported the earthquake as they were experiencing it in real-time. The US Geological Survey reported the quake on their website a full three minutes after Twitter, and both the BBC and the Chinese government learned about the quake through their monitoring of Twitter approximately five to seven minutes after the quake commenced.

When the US Airways plane landed in the Hudson, Twitter users were the first to buzz about the accident, beating the New York Times' online reporting of the accident by a reported 20 minutes.

A system capable of sifting through, organizing, delivering and presenting this enormous and growing amount of user-published information as it unfolds online in real time would be extremely advantageous across many spectrums. Investors, for example, could benefit tremendously. Markets move in real-time, all the time. In the Digital Age, access to immediate and actionable investment information can be the difference between success and failure. It is more often people's reactions to news stories and events that profoundly impact financial markets, rather than the events themselves.

SUMMARY OF THE EMBODIMENTS

Embodiments of the present disclosure provide systems, methods and devices for leveraging online consumer sentiment and activity level algorithms to create highly customer-relevant B2B and B2C applications for multiple niche markets and vertices.

Illustrative embodiments include apparatus for analyzing micro-blog messages comprising a server for receiving micro-blog messages, a clusterer for clustering received messages, a database for storing a set of classification rules, indexed by nouns and/or noun phrases in the classification rules, a classifier for classifying the clustered messages according to the set of classification rules to produce a set of scored messages, and a matcher for matching the scored messages to search requests. Illustrative embodiments further include a knowledge base for storing an ontology and a classification rule generator for generating from the knowledge base the set of classification rules that are stored in the database.

Illustrative embodiments further include methods for alerting a user to micro-blog activity by examining received micro-blogs for abnormal activity and alerting a user when such activity is detected. Illustrative embodiments further include methods for parsing micro-blog messages to form vectors of words and/or phrases, successively aggregating the words and/or phrases over multiple time periods to form aggregated vectors, classifying the aggregated vectors to form predictions associated with the different time periods and alerting a user when a prediction exceeds a predetermined level.

BRIEF DESCRIPTION OF THE DRAWINGS

These and other objects and advantages of the present invention will be apparent to those of ordinary skill in the art in view of the following detailed description in which:

FIG. 5 is a flowchart depicting further details of an illustrative embodiment of one portion of the flowchart of FIG. 4;

FIG. 8 is a flowchart depicting further details of an illustrative embodiment of one portion of the flowchart of FIG. 7;

FIGS. 15A and 15B are depictions of first and second illustrative account display screens used in the practice of the invention;

FIG. 15C is a depiction of a first illustrative login display screen used in the practice of the invention;

FIG. 15D is a depiction of a first illustrative settings display screen used in the practice of the invention;

FIGS. 15E, 15F, 15G are depictions of illustrative MainAlert, MainAlertEntryEdit and MainEntry display screen used in the practice of the invention;

FIGS. 15H, 15I, 15J are depictions of illustrative result display screens used in the practice of the invention;

FIG. 15K is a depiction of a first illustrative interval specification display screen used in the practice of the invention;

FIGS. 18A-18H are depictions of a specific application of the graphical user interface to generate a search inquiry.

DETAILED DESCRIPTION

Figure 1:
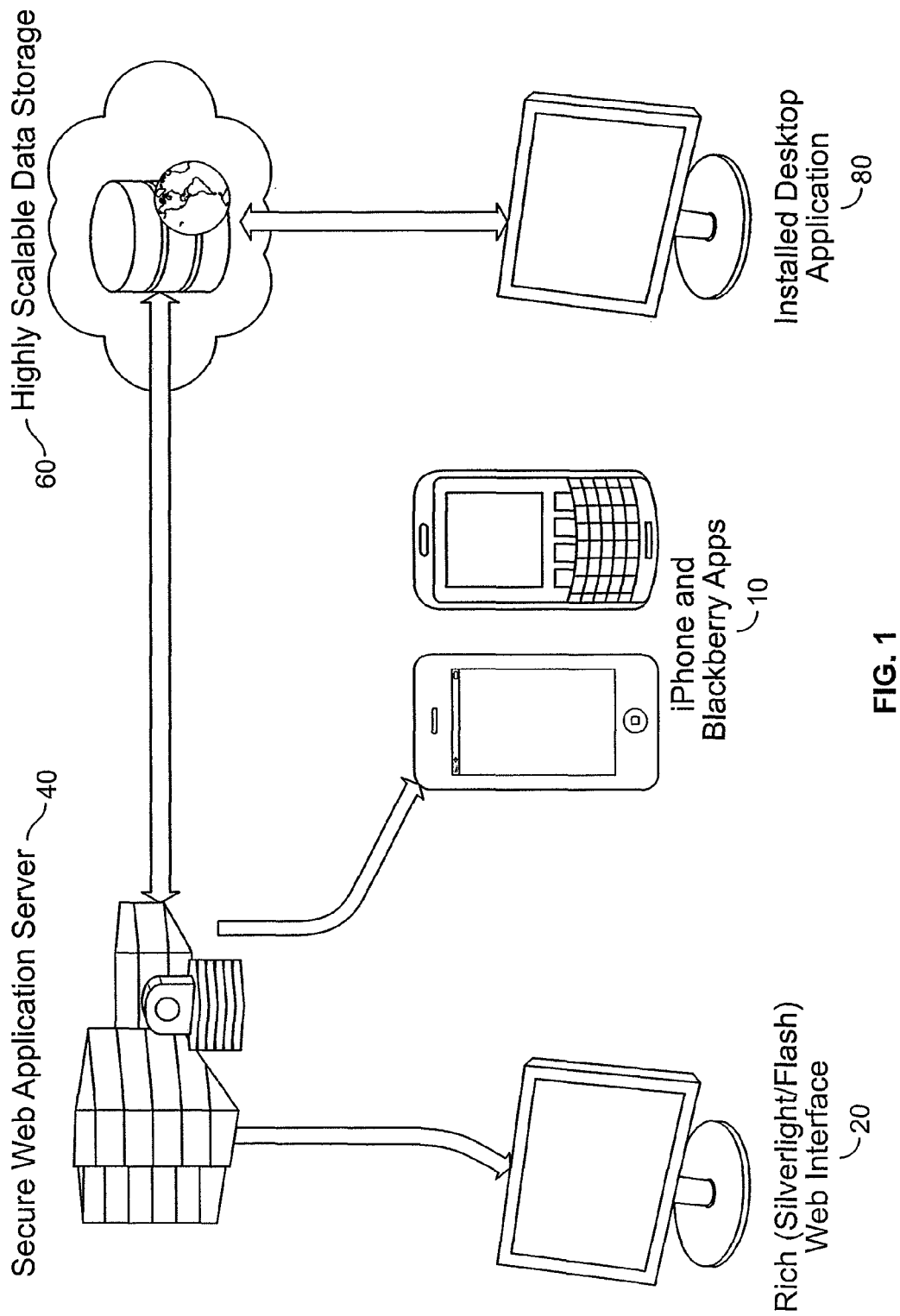
FIG. 1 depicts the environment in which the present invention is practiced.

FIG. 1 depicts the environment in which the invention is practiced. As noted above, online social media has reached critical mass. Twitter reports that its users now broadcast about 55 million tweets a day. In just four years about 10 billion of these messages have accumulated. With the exception of a small number of messages in accounts that have been designated protected, nearly all of these messages are publicly available. Indeed, Twitter recently announced plans to donate its archive to the Library of Congress and to supply it with continuous updates. Twitter users and other micro-bloggers are represented in FIG. 1 by iPhone and Blackberry Apps 10. Other sources of publicly available information on the Internet are represented by Web interface 20.

The present invention uses a secure web application server 40 and data storage 60 to process the messages that are available from micro-bloggers 10 and from other sources 20 on the Internet. Users may use a variety of desktop applications 80 to access the information stored in data storage 60.

Figure 2:
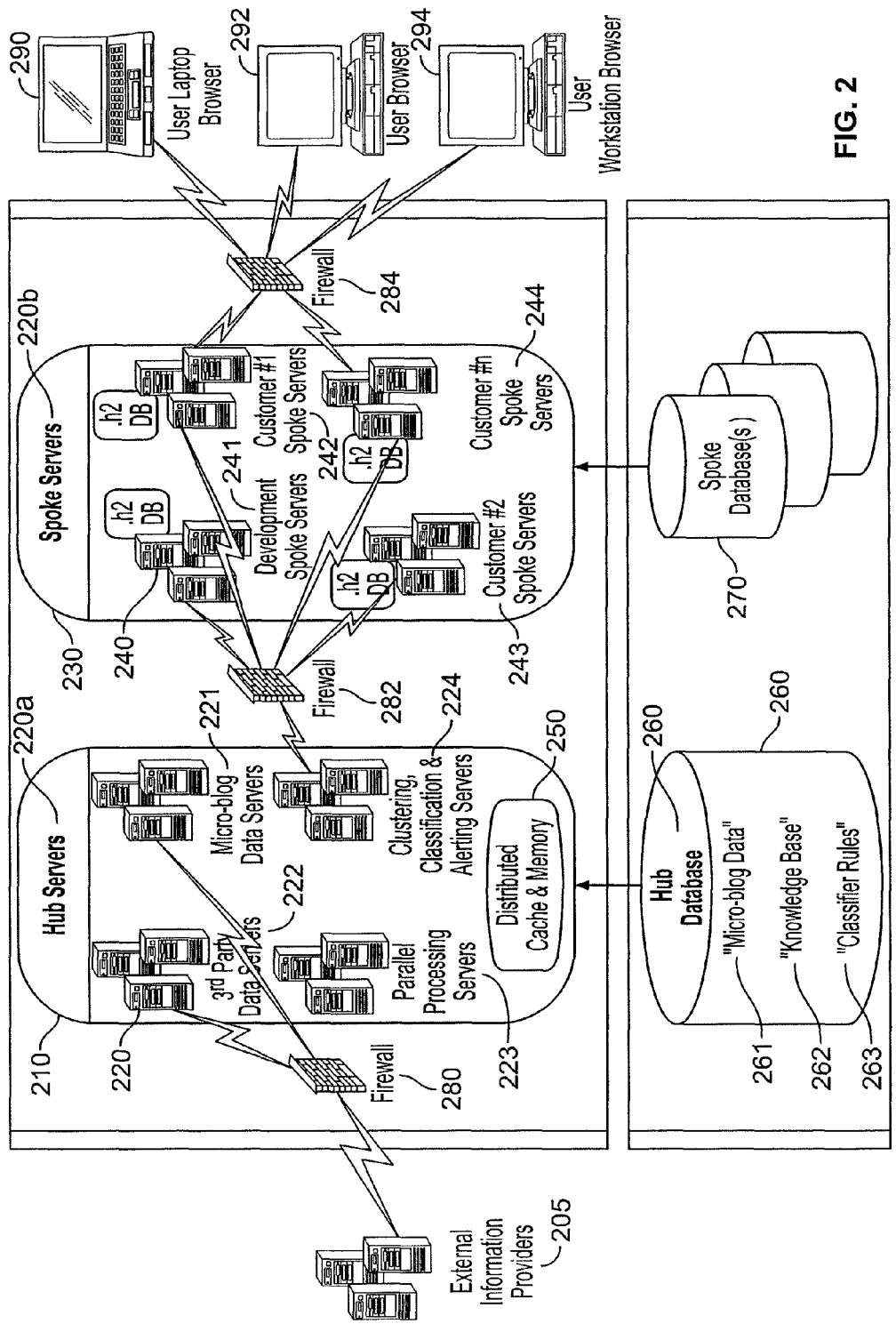
FIG. 2 is a block diagram of a first illustrative embodiment of the invention.

FIG. 2 is a block diagram of an illustrative computer system 200 that may be used to provide the functions of web application server 40 and data storage 60 of FIG. 1 in the practice of the invention. Preferably, computer system 200 comprises a first array 210 of servers 220, a second array 230 of servers 240, a distributed cache and memory 250, a first database 260, and a second database 270. A firewall 280 is located between external information providers 205 and first array 210; a firewall 282 is located between the first array 210 and the second array 230 of servers; and a firewall 284 is located between the second array of servers and various user devices such as a laptop browser 290, a browser 292, and a workstation browser 294. As will be described below, there are two types of external information providers 205: sources of micro-blog messages and other input and sources of information databases about specific subjects Illustratively, the first and second arrays of servers are arrays of virtual servers running on Amazon's EC2 system. The first array of servers further comprises micro-blog data servers 221, third party data servers 222, parallel processing servers 223, and clustering, classification and alerting servers 224. The second array 230 of servers further comprises development spoke servers 241 and customer spoke servers 242, 243 and 244. While only three sets of customer spoke servers are illustrated in FIG. 2, it will be understood that more sets of customer spoke servers, or fewer sets, may be used. As will be appreciated each server 220, 240 has access to various memory resources such as semiconductor and/or disk memories on which are stored computer programs that control the servers. The operation of certain of these programs is described below. Cache and memory 250 are used primarily in the operation of parallel processing servers 223.

Database 260 has three major components: a micro-blog database 261, a knowledge base 262, and a classifier rules database 263. Micro-blog database 261 is a relational database that stores tables, for example, of the raw text messages obtained from micro-bloggers and other Internet sources, maintains dictionaries of the words and phrases used in these messages, maintains indices of where these words and phrases are used in the messages, maintains data tables on word and phrase usage, stores processed text messages, and stores vectors of information representing each of the text messages. Further information about database 261 is set forth below in conjunction with FIGS. 3-14, 16 and 17.

Knowledge base 262 is a relational database that stores ontologies and taxonomies relating to specific subjects. Further information about knowledge base 262 is set forth below in conjunction with FIG. 17. Classifier rules database 263 is a relational database that stores a set of classification rules derived or inferred from knowledge base 262. Further information about classifier rules database 263 is set forth below in conjunction with FIG. 10. For purposes of illustration, the invention will be described in the context of methods, systems and software for analyzing micro-blogs for information relating to public and private entities that issue securities; and the knowledge base and the classifier rules will be described in that context. However, it will be understood that the invention may be applied in numerous other contexts as well.

Database 270 provides a relational database for each of the customer spoke servers 242-244. Further information about these databases is set forth below in conjunction with FIGS. 13 and 14.

In addition, further information about computer system 200 will be evident from the discussion of its operations as set forth below.

Figure 3:
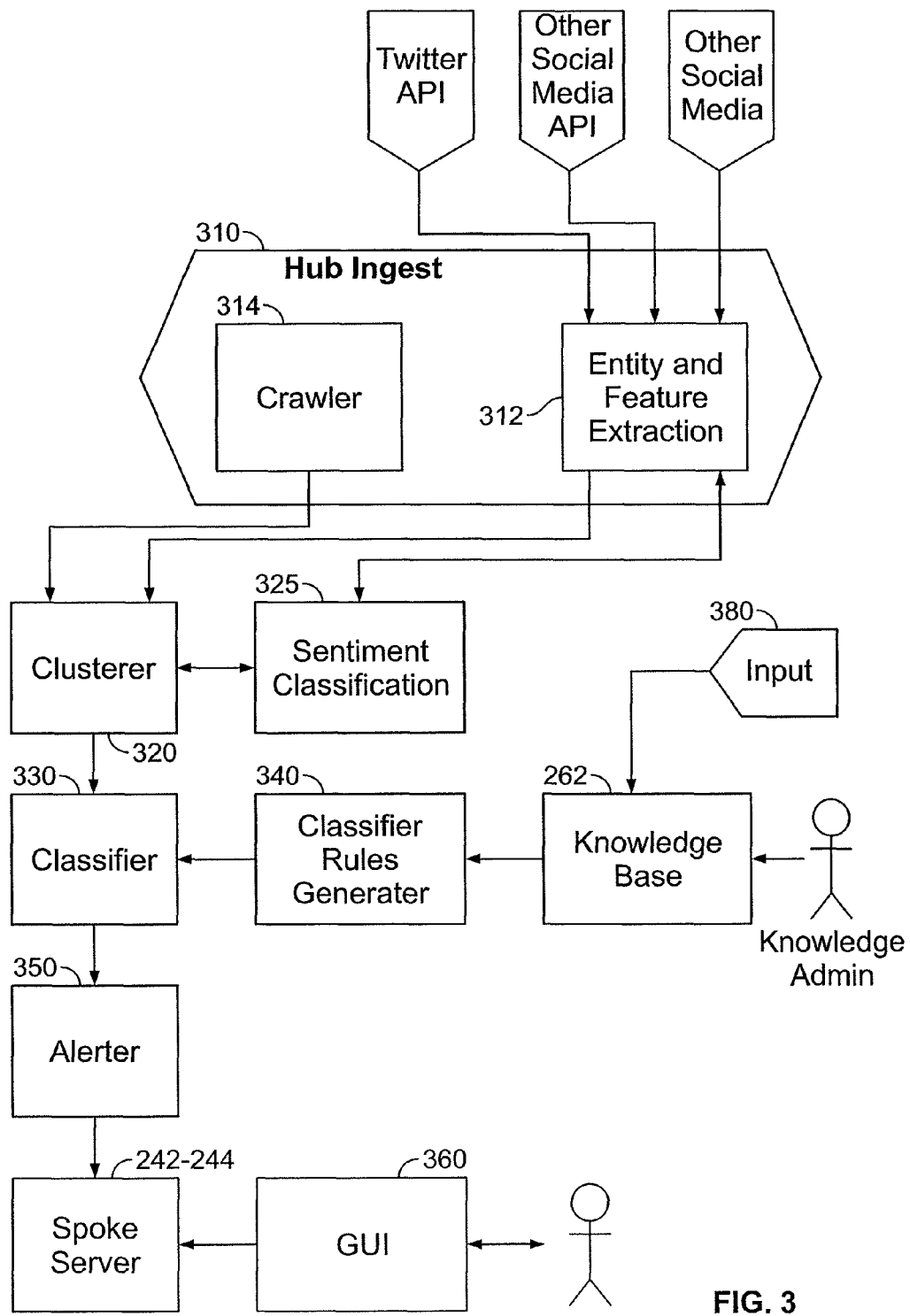
FIG. 3 is a flowchart depicting the general flow of information in a first illustrative embodiment of the invention.

FIG. 3 is a flowchart depicting the general flow of information in a first illustrative embodiment of the invention. Text messages and other input are received at array 210 of servers during input step 310; these messages are sorted into groups of related messages at clustering step 320; sentiment values for the messages are determined at step 325; and the messages are classified by topic at classifier step 330 using a set of classifier rules stored in database 263. The classifier rules are generated at step 340 from knowledge base 262. The classified messages are matched at alerter step 350 by alerting servers 224 with search or alert topics submitted by one or more users via browsers 290, 292, 294 through array 230 of spoke servers. The search or alert topics available to the user are derived from the knowledge base. The results of the match are provided by the spoke servers 240 to the user browsers 290, 292, 294. The information flow also includes a knowledge base input at step 380 that loads the knowledge base with one or more ontologies and taxonomies.

Input step 310 receives messages from one or more micro-blog platforms, such as Twitter, illustratively by accessing the applications programming interfaces (APIs) for the micro-blog and retrieving publicly available messages. At present, an average of nearly 40,000 tweets are generated each minute. To process these messages, the messages are distributed among several servers 220 that perform the operations described below. In the case of tweets, each message is a text message that is no more than 140 8-bit characters long. In addition to the text of the message, each retrieved message includes metadata (i.e., information about the message) such as a time stamp specifying the time the message was created, an indication of the language of the message, an indication of the author, an indication of the platform from which the message was retrieved, annotation tags, etc. In some cases, the physical location of the author in terms of latitude and longitude or other geographical indicia is also available and is retrieved. Other micro-blogs have different formats. In addition, input step 310 may also receive inputs from one or more web crawlers or other third parties. As will be described more fully below, input step 310 processes the words of the text messages received from the various APIs into a more consistent set of terms and formats that can be used for searching.

Clustering step 320 identifies messages that are redundant and/or have little or no interest, and groups together messages which have a high degree of linguistic similarity. Clustered messages are supplied to classifier step 330 which analyzes the messages with a set of classification rules to identify those messages that appear to be relevant to a set of pre-specified topics. As mentioned above, the classifier rules are generated from the knowledge base. The classified messages are provided to alerter step 350. The messages received by the alerter step are then matched to topics provided by a user selecting from among the same set of topics known to the knowledge base; and the messages relating to a user-specified topic are supplied to that user.

Figure 4:
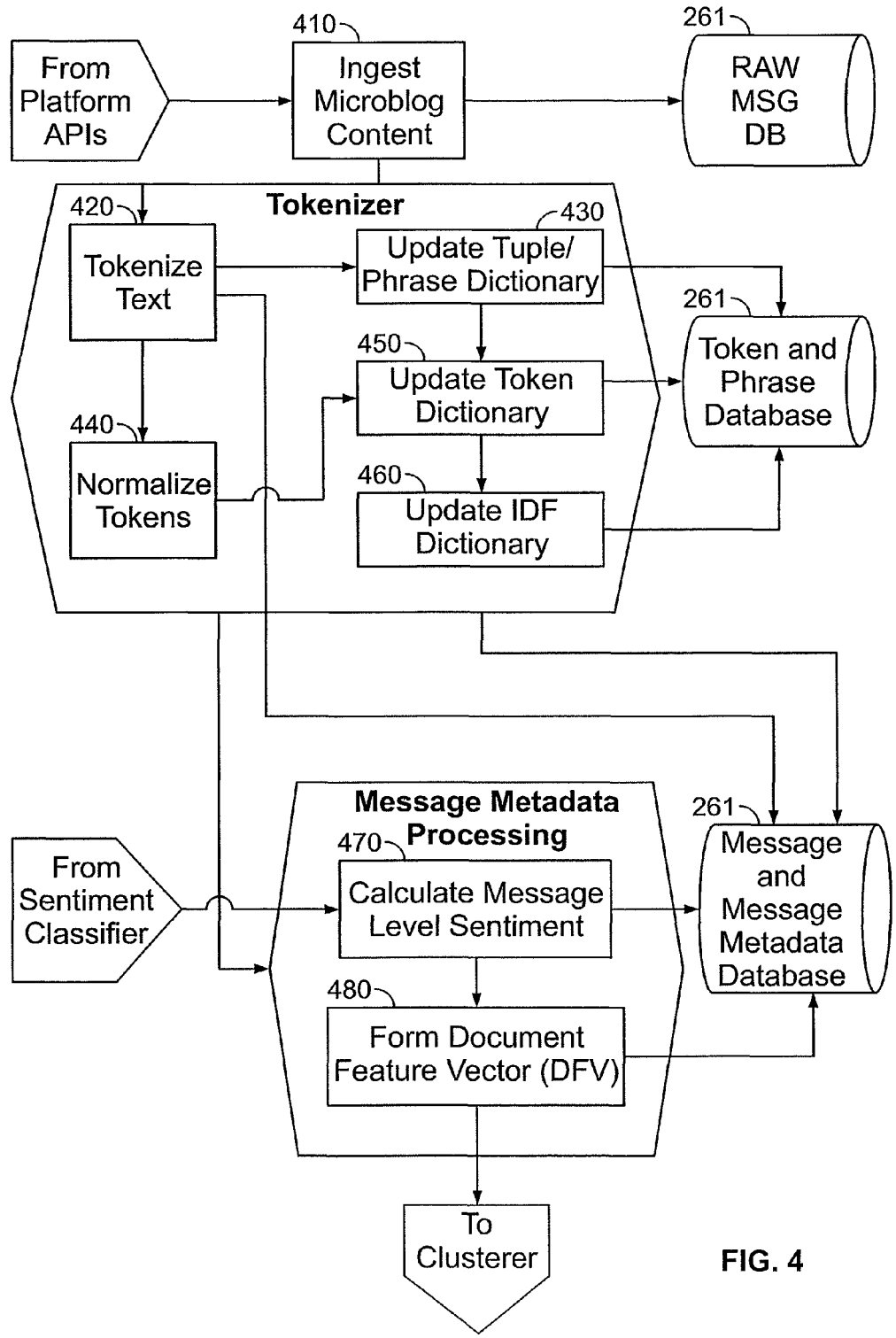
FIG. 4 is a flowchart depicting further details of an illustrative embodiment of one portion of the flowchart of FIG. 3.

FIG. 4 is a flowchart depicting an illustrative embodiment of the input step 310 of FIG. 3. At step 410, each input text message is assigned a unique identification number (illustratively, IG_MSG_ID); and the text of the message is stored in an appropriate table in database 261 that is indexed by the unique identification number. Similarly, each item of the metadata that accompanies the raw message is stored in appropriate metadata tables also indexed by the unique identification number assigned to that message, as well as a unique identification number assigned to said piece of metadata. The raw input text message is tokenized at step 420 and the resulting tokens are normalized at step 440. During the normalization process, a tuple/phrase token dictionary is updated at step 430; a token dictionary is updated at step 450; and a global inverse document frequency (GLOBAL IDF) table is updated at step 460. All these tables are stored in micro-blog database 261.

The metadata is also processed. At step 470, message level sentiment is calculated as described further below. And at step 480, a document feature vector (DFV) is formed. The results of steps 470 and 480 are also stored in database 261. The information stored in database 261 is then made available to clustering step 320, which is described in more detail in FIG. 7.

The characters of the received message can be any symbol that can be transmitted and received using the applicable communication protocols. Preferably, the characters of the received message are coded using UTF-8 (8-bit UCS/Unicode Transformation Format). UTF-8 is a variable length character encoding that is backward compatible with the 128 US-ASCII characters. Thus, a single byte is used to identify the 128 US-ASCII characters and additional bytes are used to identify other characters.

At step 420, the message text is tokenized by breaking the message into a series of elemental units, e.g. in English, a set of contiguous non-whitespace characters separated by whitespace or other non-word characters. Each elemental unit may be referred to as a token. A variety of rules are used in the tokenizing process with the general goal of simplifying and standardizing the text and clearly indicating the beginning and end of each token. Illustratively, tokenization comprises three primary operations: identification of specific primary units (e.g., URLs, Twitter-style "HashTags" (a convention of identifying subject matter with a "#" symbol followed by a word as a single unit)); division of a message into whitespace boundaries; and division of a message on other inferred word boundaries (e.g., certain punctuation combinations not excluded by the first operation). Each token is assigned a unique identification number and entered into a dictionary that is stored in database 261.

At step 430, token tuples (i.e., multiple consecutive tokens) and phrases (i.e. chunked grammatical units) in the set of tokens are compared with the contents of the tuples/phrases dictionary and certain "high value" new tuples and/or phrases are assigned a unique identification number (illustratively, PHRASE_ID) and entered into the tuples/phrases dictionary that is stored in database 261. Phrases are identified by using a Context Free Grammar, after applying heuristic part of speech tagging, to detect high probability noun (and other) phrases in the stream of tokens. A Context Free Grammar is a simple set of syntactic reduction rules which use only local relationships between sets of adjacent tokens to parse an input stream. The noun and other phrases that are identified are then compared with the contents of the tuple/phrase dictionary and certain "high value" new tuples and phrases are added to the dictionary.

Following tokenization, a normalized version of each token is formed at step 440. Spellings are standardized; certain leading or trailing punctuation is removed; and tokens that are semantically alike are first reduced to a common highest frequency synonym and then stemmed (or conflated) for case, tense, voice and pluralization endings. A variety of stemmers for performing these functions are known in the art. In some embodiments, normalization step 440 uses a heuristic stemmer, while in others, normalization step 440 uses a table based probabilistic stemmer. Additional information on various stemming processes is set forth, for example, at pages 91-96 of Croft et al., *Search Engines Information Retrieval in Practice* (Addison Wesley, 2010) which is incorporated herein by reference.

As the normalized tokens are formed, they are compared at step 450 with the contents of the token dictionary that is maintained in database 261 and any new tokens are assigned a unique identification number (illustratively, NORM_TOKEN_ID) and entered into the dictionary.

At step 460, the global inverse document frequency (GLOBAL IDF) table is updated An IDF table identifies the rarity of a token or tuple/phrase in a group of messages. Illustratively, the IDF value of a token is determined by taking the logarithm of the total number of messages divided by the number of messages in which the token appears. Thus (refer to Equation [1] below):

$$IDF(token_i)=\log((\text{number of messages})/(\text{number of messages with token}_i)) \quad \text{Equation [1]}$$

The IDF value for a tuple or phrase is determined in similar fashion and used to identify high value tuples and phrases. Preferably, IDF values are updated for each message that is received. Thus, for each message received, the number of messages is incremented; and for each token$_i$ in a message, the number of messages with token$_i$ is incremented. As the IDF values of the tokens in a message are calculated, each value is stored in the database and associated with the corresponding normalized token. As its name suggests, the GLOBAL IDF table stores the inverse document frequency for the tokens in all messages processed by system 200. In an alternative illustrative embodiment of the system it may be permissible to limit the subset of the messages that contribute towards the creation of the IDF.

To facilitate subsequent processing, each message is reverse indexed during the tokenization process by each of the original tokens produced during tokenization step 420 and each of the normalized tokens produced during normalization step 440. A reverse index is a concordance that lists for each token every message in which that token appears and, advantageously, indicates the number of times it appears in messages in a given time interval. The reverse index is stored as a table representing this concordance of tokens to messages, along with a database view providing access to both a list of messages for a given time interval that use said token as well as counts for the number of times said token appears in messages in the interval. The reverse index is stored in database 261.

It is frequently useful in analyzing text messages to be able to assess opinion and/or emotion expressed in the message. This is termed "sentiment"; and the determination of sentiment at step 470 identifies any emotive in the message. Illustratively, this is done using a look-up table in which sentiment values or valences are assigned to a set of words in the table; and the normalized tokens in the message are compared with the table entries to determine their sentiment value. For example, positive to negative sentiment may be scored on a scale of +10 to −10. Tokens such as "euphoric" might be rated +10 and "angry"−8. Neutral tokens would have values around 0. Tokens that are not found in the sentiment value table are ignored. To calculate message level sentiment, the sentiment values associated with the tokens in a message are retrieved from the table; and the average sentiment value of the tokens in the message is determined. This average value is added to the metadata associated with the text message. In other illustrative embodiments, probabilistic measures of sentiment class are used (e.g. Support Vector Machines trained on sentiment labeled training sets).

A flowchart depicting the determination of average sentiment value is set forth in FIG. 5 Normalized tokens are received at step 510. At step 520, the tokens are used to look up sentiment or valence values in the token-valence table. The values retrieved from the table are then used to calculate an average sentiment value for the message at step 530. The calculated sentiment value is then returned at step 1540 and stored in database 261.

Step 480 assembles from the database a document feature vector (DFV) for each message. The DFV includes:
- a dimension for each unique token in the message (or message set) which includes frequency, TF, in the message (or message set) times the token's IDF value;
- a dimension for each normalized version of a token appearing in the message (or message set) which includes frequency and IDF values;
- a dimension for certain high IDF noun tuple/phrase;

a dimension for each point of metadata received from the hosting platform (e.g., author, platform, geographical tag, language, timestamp, additional annotation tags, etc.);

referenced URLs appearing in the raw message;

a positive sentiment value; and a negative sentiment value.

After a DFV for a message is assembled, the clustering step 320 is informed that another message is ready for processing by providing it with the MSG_ID for that message.

Figure 6:
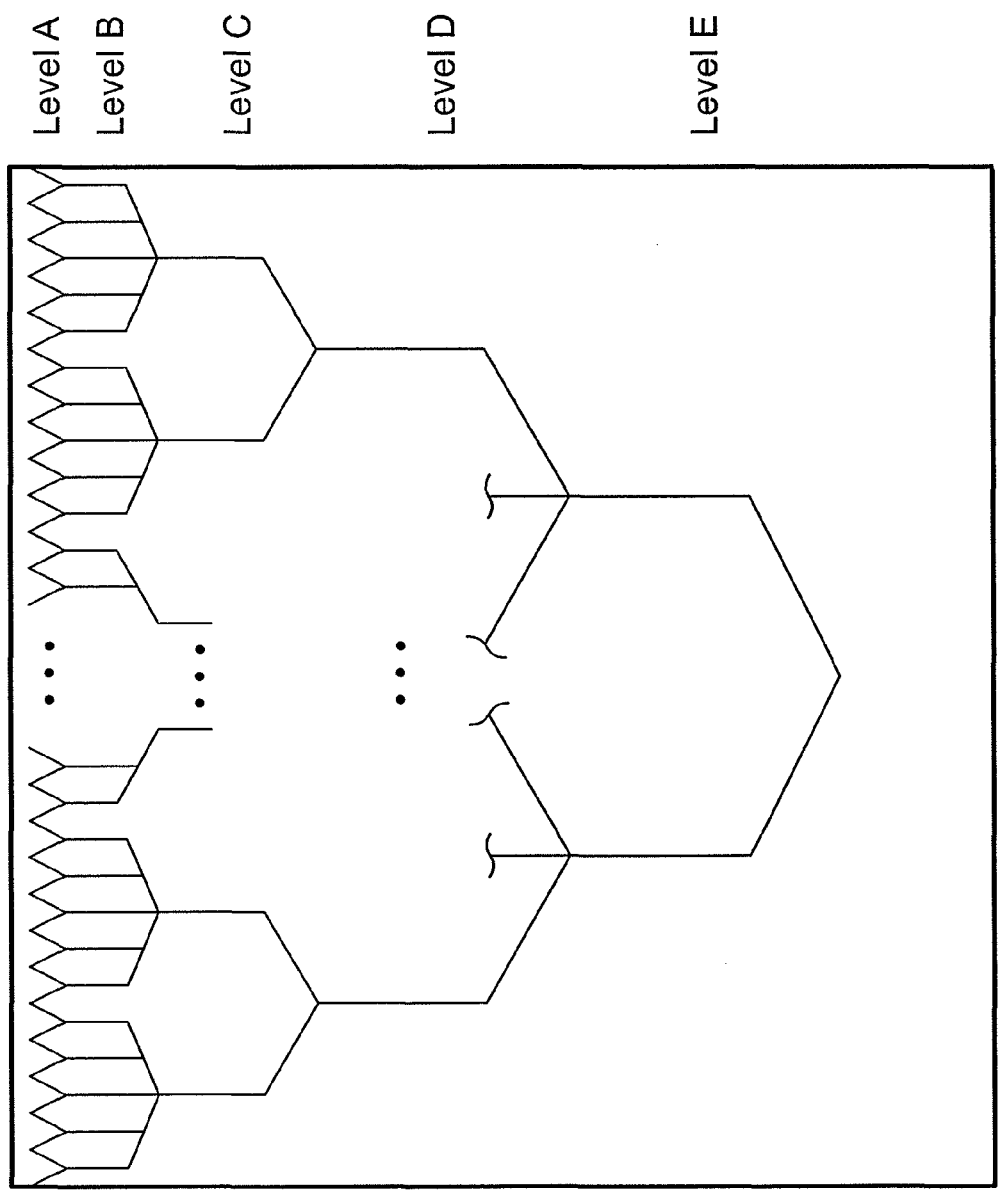
FIG. 6 is a schematic illustrating the relation among certain steps in an illustrative embodiment of the invention.

Clustering step 320 operates continuously to cluster together messages that have common tokens that are received over larger and larger time periods. This clustering process operates in parallel over the different time periods. Its operation is schematically illustrated in FIG. 6. Illustratively, all the messages received from feature set generator 480 in a one minute time period are first clustered together. This process is repeated continuously on the messages received from feature set generator 480 in each subsequent one minute time interval. For ease of reference, this clustering is identified as level A clustering in FIG. 6. In addition, in parallel with the level A clustering, the clustered messages from each five consecutive one minute time periods are clustered together into five minute clusters. This clustering is identified as level B clustering in FIG. 6. And in parallel with the level A and level B clustering, the clustered messages from each two consecutive five minute clusters are also clustered together into ten minute clusters (level C clustering); the clustered messages from each three consecutive ten minute clusters are clustered together into thirty minute clusters (level D clustering); and the clustered messages from each two consecutive thirty minute clusters are clustered together into one hour clusters (level E clustering).

Thus, level A clustering is performed at time intervals of one minute (or $1/60^{th}$ of an hour) each; level B clustering is performed at time intervals of five minutes (or $1/12^{th}$ of an hour) each; level C clustering is performed at time intervals of ten minutes ($1/6^{th}$ of an hour) each; level D clustering is performed at time intervals of 30 minutes (or ½ hour) each; and level E clustering is performed at a time interval of one hour. Level B clustering begins as soon as clustering of the first one-minute interval of text messages is complete and the clustered messages are presented to step 710; level C clustering begins as soon as clustering of the first five-minute interval of one-minute intervals is complete and the clustered messages are presented to step 710; and so on.

This process continues for larger time periods as well. Illustratively, four consecutive one hour clusters are clustered into four hour clusters; and consecutive four hour clusters are used to form eight, twelve and/or twenty-four hour clusters. Consecutive twenty-four hour clusters are used to form five and/or seven day clusters; consecutive weekly clusters are used to form monthly clusters; and consecutive monthly clusters are used to form quarterly, semi-annual and annual clusters. Again, these clustering operations are performed in parallel with the higher frequency (levels A-E) clustering operations.

Figure 7:
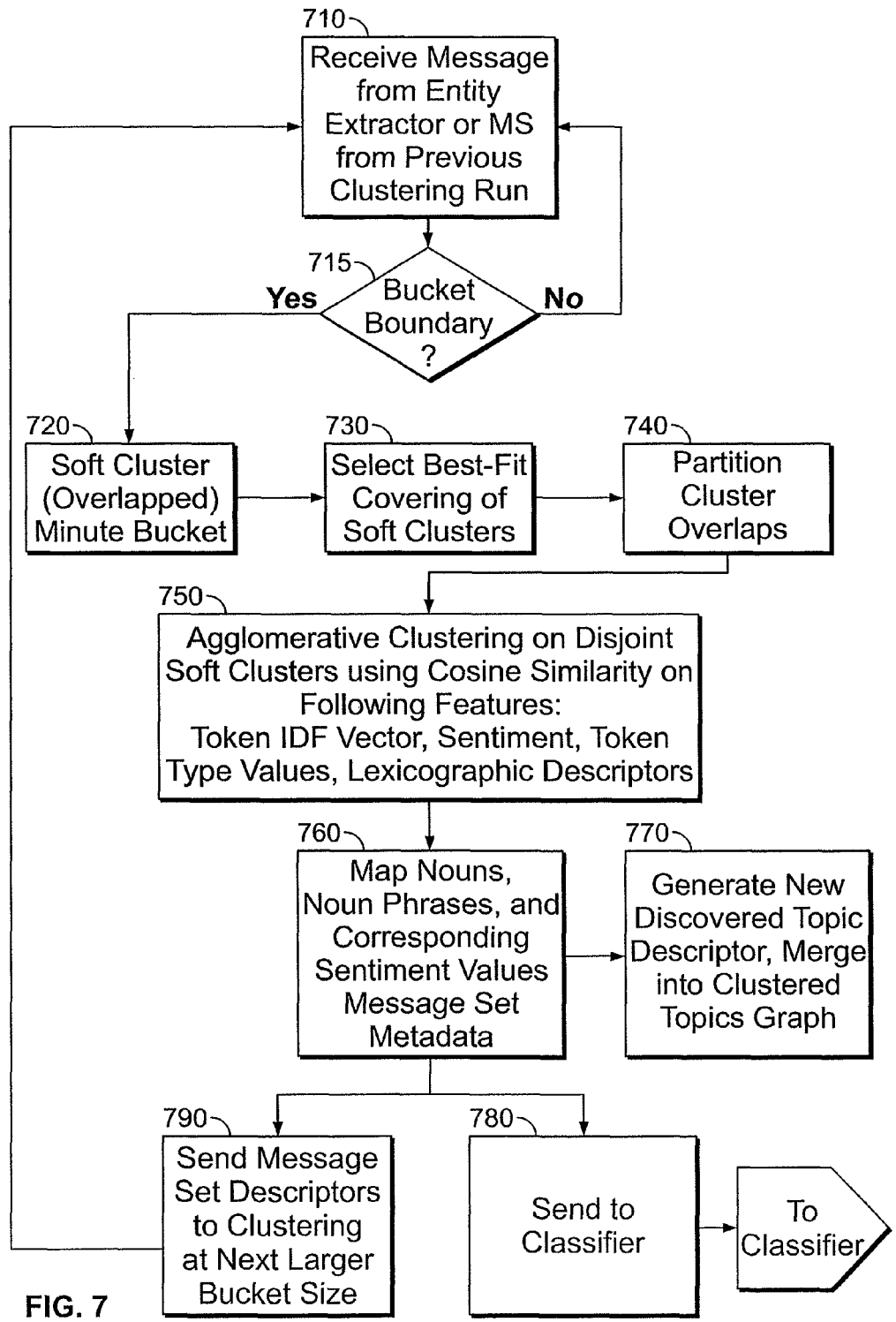
FIG. 7 is an illustrative embodiment of another portion of the flowchart of FIG. 3.

Throughout the different levels in the clustering process, the steps performed by the clusterer are essentially the same. The major difference is the time period (or bucket) over which the clustering is performed. As shown in FIG. 7, clusterer 320 receives the messages to be clustered at an input step 710 and accumulates these messages at step 715 for the time period associated with this level of clustering. At step 720, soft clusters are formed using seed tokens. The seed tokens are either tokens that are within a predetermined range in the GLOBAL IDF table or are being used more frequently in the current time interval or both. The soft clusters are formed by associating with each of the seed tokens all of the messages of that time period (or bucket) that contain that token. The selection of messages that contain a particular token is done using the reverse index of message tokens table that is formed during the text tokenizing process to identify the messages.

The range of GLOBAL IDF values that is used to select tokens in the practice of this embodiment of the invention should be large enough to encompass at least several thousand tokens. The boundaries of the range should be selected so that the tokens that are used for this stage of the clustering process are relatively distinctive so as to identify messages that are likely to have some interest and are not trivial. At the same time, the tokens that are used should not be so unusual that their appearance in the messages being monitored is a rare occurrence.

Those tokens which appear with a frequency greater than expected in a given time interval are identified by constructing a LOCAL IDF table for all the tokens in the text messages within the time interval. Thus (refer to Equation [2] below):

$$\text{LOCAL IDF}(\text{token}_i) = \log((\text{number of messages in time interval})/(\text{number of messages with token}_i)) \quad \text{Equation [2]}$$

The tokens appearing with a frequency greater than expected are identified by forming the ratio of the GLOBAL IDF value of a token to its LOCAL IDF value and including in the list of seed tokens those tokens having a GLOBAL/LOCAL IDF ratio that exceeds a threshold. Preferably, the threshold is set at a value sufficiently above 1.0 as to eliminate tokens which have not experienced any anomalous growth in the time interval.

Each soft cluster is assigned a unique identification number (illustratively, MSG_SET_ID and is stored in cache memory 260. At this stage in the clustering operation, any message may appear in more than one soft cluster. In addition, it is likely that some messages will not be in any soft cluster because they did not contain any tokens having IDF values within the predetermined range of IDF values or IDF values that are used more frequently in the current time interval.

At step 730, a best-fit of the soft clusters is created by selecting a core subset of messages in each soft cluster that represents the best overall density of messages and removing from the soft cluster those messages not present in the central region of highest density. This is done by constructing for each soft cluster a distribution curve that describes the relative position of each text message in the soft cluster; and the subset of messages representing the greatest density concentration is selected as the core of the soft cluster. A new Document Feature Vector (DFV) is created which is the weighted average of the DFVs of the messages in the core subset.

In a preferred embodiment, the soft cluster density is represented by associating with each constituent message, the pair-wise, average cosine similarity between said message and the other messages in the soft cluster. The cosine similarity of two vectors V1 and V2 is given by (refer to Equation [3] below):

$$\text{Cosine similarity} = (V1 \cdot V2)/(\|V1\| \|V2\|), \text{ where, in a preferred embodiment, the norm is the simple Euclidean Norm} \quad \text{Equation [3]}$$

The cosine similarity is calculated by summing the squares of the IDF values of the tokens that are the same in each vector; adding weighted values for metadata dimensions that are the same; and normalizing the result by the product of the Norms of V1 and V2. Thus, the region of greatest density may be selected by choosing the subset of a soft cluster where this pair-wise, average cosine similarity is highest.

At step 740, remaining soft cluster overlaps are eliminated by assigning each message that is present in more than one cluster to the one cluster having the "closest" DFV. Closeness is determined by calculating the cosine similarities between the DFV associated with the message and the DFVs associated with the soft clusters in which it is present. In some embodiments, closeness is determined by calculating the average cosine similarity between the DFV associated with the message and each DFV associated with the messages in the cluster. The message is then assigned to the cluster for which the cosine similarity (or average cosine similarity) was the highest. As a result, this step assigns a message to its most similar cluster, and to that cluster alone.

At step 750, agglomerative clustering is performed on the remaining clusters and any messages that were not clustered in soft clustering step 720 because they did not contain a token having an IDF value within the selected range of IDF values. Two clusters are merged if the distance between the two clusters calculated as the cosine similarity of their DFVs is below a threshold distance and if the distribution of the resulting cluster is below a sparsity threshold. Individual messages are merged into the cluster with the closest centroid (i.e., the cluster with which said message has the highest average cosine similarity). The result is a set of messages that have a high average cosine similarity. This set of messages is assigned a unique identification number MSG_SET_ID and is stored in cache memory 250.

At step 760, neighborhood sentiment values are calculated for high IDF tokens and phrases associated with the message set. Further details of this process are set forth in FIG. 8. At step 810, a normalized, IDF tagged message set is received from step 750 of the clusterer. At step 820, valence words are identified in the neighborhood of each token and phrase and the values of those words are ascertained. At step 830, the weighted average of the sentiment values in the neighborhood is determined. At step 840, the weighted average is returned. As a result of this process, a list of words and phrases is generated that have high IDF values indicative of the most descriptive words and phrases in the message set, along with the associated neighborhood sentiment value for each word and phrase in the list.

At step 770 the word or phrase with the highest product of frequency (TF='term frequency' in the message) and IDF value is presented to the knowledge base as a candidate for a generated taxonomy. Lower TF×IDF value words and phrases are presented to the knowledge base as candidate properties for this new candidate topic.

At step 780, the clusters produced by step 750 and identified by the MSG_SET_ID are stored in a message set table MSG_SET_TBL in database 261. The message set includes the tokens of the text messages in the message set, nouns and noun phrases associated with the text messages in the message set, the identification of the source of each text message, and other metadata that will accompany a text message. The classifier is notified that the message set is available by providing the classifier with the MSG_SET_ID for the message set.

At step 790, the clusters produced at step 750 are also provided to the input to the clusterer at the next clustering level. For example, if the output of step 750 is clusters produced in a one minute time interval (level A), the clusters are provided to the input of the clusterer at level B where five consecutive one minute outputs will be accumulated and clustered.

The clustering process at level B and at all other levels follows the same steps as the clustering process at level A. Clusterer 320 accumulates the message sets at step 715 for the time period (or bucket) associated with that level of clustering. Thus, at level B, the clusterer accumulates message sets for a five minute interval. At step 720, soft clusters are formed by selecting as seed tokens those tokens that are values in a predetermined range in the IDF table or are being used more frequently than usual in the five minute time interval, or both, and then associating with each of the seed tokens all of the messages of the five minute time period (or bucket) that contain that token. Again, the ratio of the GLOBAL IDF value to the LOCAL IDF value is compared with a threshold to determine the more frequently used tokens; but the LOCAL IDF value is computed using all the messages in the new five minute interval. Preferably, the predetermined range of token IDF values is the same at each level of processing. In some embodiments, however, it may be desirable to change the range as the size of the time interval increases.

Again, the selection of messages that contain a particular token is done using the reverse index of message tokens that is formed during text tokenizing process. Again, any message may appear in more than one soft cluster; and some messages will not be in any soft cluster. The remaining steps of the clustering process are then performed so as to produce a new message set based on the larger time interval. The new message set is given a unique identification number MSG_SET_ID and is also stored in the message set table MSG_SET_TBL.

And the process repeats over time intervals of greater and greater duration.

The classifier classifies incoming message sets received from the clusterer by applying to them a set of classification rules so as to determine the topics to which the various text messages relate. The rules are essentially in the format: "If A is found in the message set, then the message set relates to topic B with a likelihood (or relevancy) of Z %." We first describe the creation of the rules from the ontology and the taxonomy stored in knowledge base 262.

Knowledge base 262 is an organized collection of knowledge about a subject. The collection is organized in the form of "classes" and "instances" of data about the classes and cross-link tables that relate the classes to each other. Since this organization is the structure of an ontology, knowledge base 262 is also referred to as an ontology. The knowledge base may also be considered a collection of information topics (or topic groups) in which each topic group is represented as a node in the knowledge base with a set of relationships between the nodes that are represented as cross-links. Specific information about the knowledge node (e.g., a company name) is stored in a Topic Group Property Bag. Specific information about a cross-link (e.g., a parent-child relation between two nodes) is stored in a Cross Link Property Bag.

A variety of software is available for controlling the operations of a knowledge base. Illustratively, knowledge base 262 uses the Web Ontology Language (OWL) and, in particular version 2 which is known as OWL2. Further information concerning OWL2 is available in OWL 2 Web Ontology Language Primer available at www.w3.org/TR/2009?REC-owl12-primer-20091027, which is incorporated herein by reference.

A taxonomy is the specification of a hierarchical relation between two or more nodes in a knowledge base or ontology. A taxonomy is illustratively represented in the present system as an acyclic directed graph on nodes of knowledge from the ontology. Since the relation is along a link, the taxonomy may be thought of as describing a facet of the ontology. The end user is able to visualize the knowledge base by navigating these hierarchical relations. The taxonomies also make it possible for the end user to visualize facets of information that may be selected to quickly reduce the range of possible choices when creating any specific search or alert criterion for processing in system 200.

Figure 17:
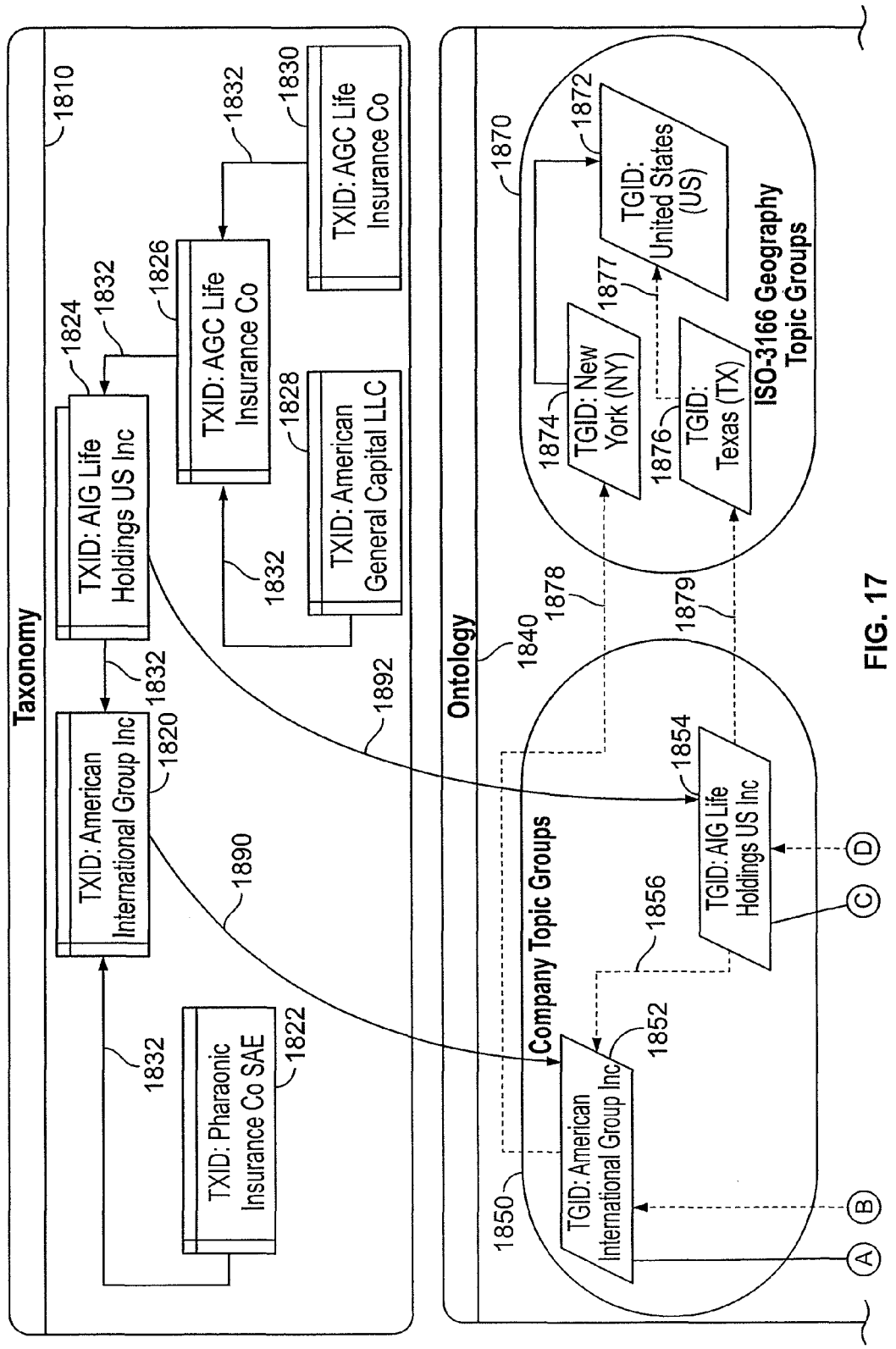
FIG. 17 is a diagram depicting an illustrative taxonomy and ontology that may be used in the practice of the invention.
Figure 17:
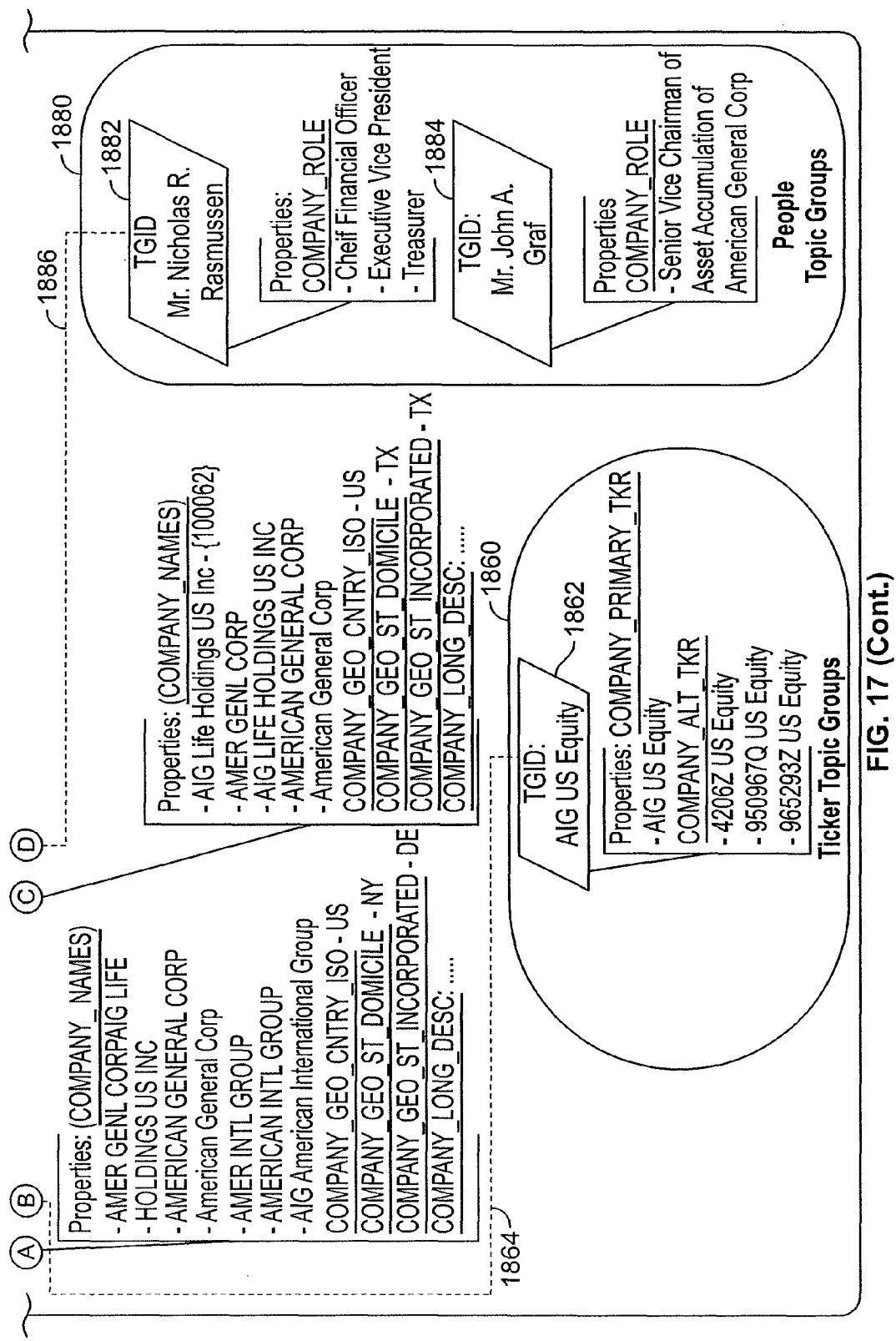

The relationship between the taxonomy and the ontology is depicted in FIG. 17 which illustrates a small portion of a taxonomy 1810 and an ontology 1840 that relate to securities and their issuers. The illustrated portion of taxonomy 1810 has six nodes: American Industrial Group Inc. 1820, Pharaonic Insurance Co. SAE 1822, AIG Life holdings US. Inc. 1824, AGC Life Insurance Co. 1826, American General Capital LLC 1828, and AGC Life Insurance Co. 1830. The taxonomy specifies a hierarchical relation between the nodes and, in particular, a subsidiary to parent relationship. This relationship is depicted by links 1832 between the various nodes. For example, link 1832 between node 1824 and node 1820 indicates that AIG Life holdings US Inc. 1824 is a subsidiary of American International Group Inc. 1820.

The illustrated portion of ontology 1840 has four major topic groups: Company Topic Groups 1850, Ticker Topic Groups 1860, Geography Topic Groups 1870, and People Topic Groups 1880. Within Company Topic group 1850 are Topic Groups 1852 for American Industrial Group Inc. and Topic Group 1854 for AIG Life Holdings US Inc. Within Ticker Topic Group 1860 is Topic Group 1862 for AIG US Equity. Within Geography Topic Groups 1870 are Topic Group 1872 for the United States, Topic Group 1874 for New York and Topic Group 1876 for Texas. Within Topic Group 1880 are Topic Group 1882 for Mr. Nicholas R. Rasmussan and Topic Group 1884 for Mr. John A Graf.

Associated with most of the groups are various properties; and between the groups are various cross links. The properties associated with the various groups illustrated n FIG. 17 are enclosed within a bracket and connected in FIG. 17 to the group with which they are associated. For example the properties associated with the Company Topic Groups identify the names of subsidiaries, the location of the company and its states of domicile and incorporation. The properties associated with the Ticker Topic Groups identify the company's stock ticker and alternative tickers. The properties associated with People Topic Groups identify their titles, amongst other characteristics, such as, non-exclusively, roles, professions, expertise, and account names on various publishing platforms.

Topic Group 1854 is linked to Topic Group 1852 by company-to-company cross-link 1856; Topic Group 1876 is linked to Topic Group 1872 by geography-to-geography cross-link 1877. Ticker Topic Groups 1860 is linked to Company Topic Groups 1850 by ticker-to-company cross-link 1864. Geography Topic Groups 1874 is linked to Company Topic Group 1852 by company-to-geography cross-link 1878. Geography Topic Group 1876 is linked to Company Topic Group 1854 by company-to-geography cross-link 1879. And People Topic Group 1882 is linked to Company Topic Group 1854 by people-to-company cross-link 1886. In addition, while not fully shown in FIG. 17, there are also cross-links between the Topic Groups associated with a particular company, geography, ticker, and people and the Topic Groups associated with other companies, geographies, tickers and people The taxonomy is related to the ontology by a first link 1890 between the ultimate parent company American International Group Inc. 1820 in the taxonomy and the American International group Inc. Topic Group 1852 in the ontology and by a second link 1892 between the first subsidiary AIG Life Holdings US Inc. 1824 in the taxonomy and the AIG Life Holdings US Inc. Topic Group 1854 in the ontology. As will be described below in conjunction with FIG. 11, the relationship between the taxonomy and the ontology is used by the present system in generation of the classification rules. The taxonomy is exposed to the end user through various interface applications and APIs in order to allow the user to specify alert and search requests in the vocabulary of topics used by the knowledge base and classifier.

Figure 9:
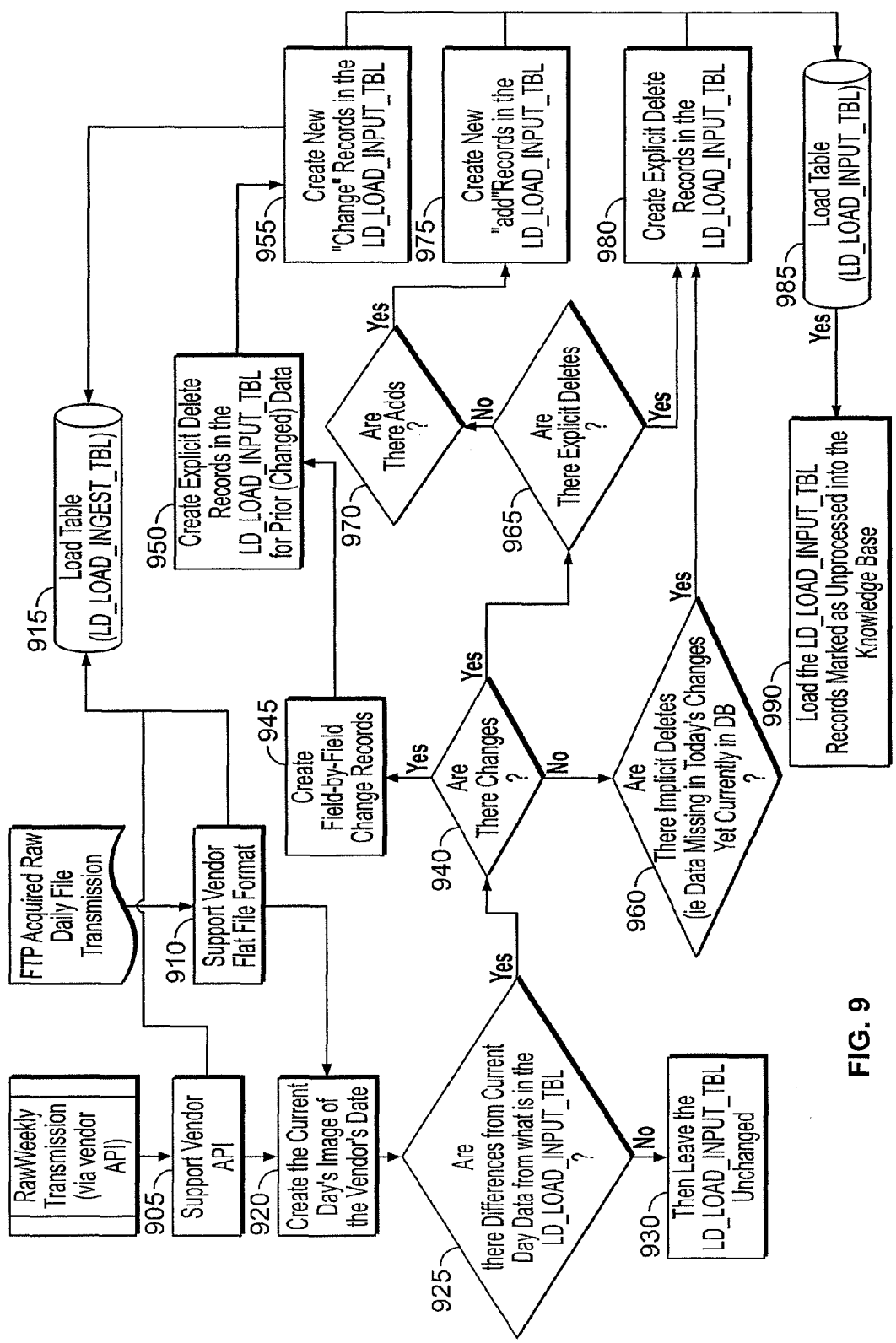
FIG. 9 is a flowchart depicting further details of an illustrative embodiment of another portion of the flowchart of FIG. 3.
Figure 10:
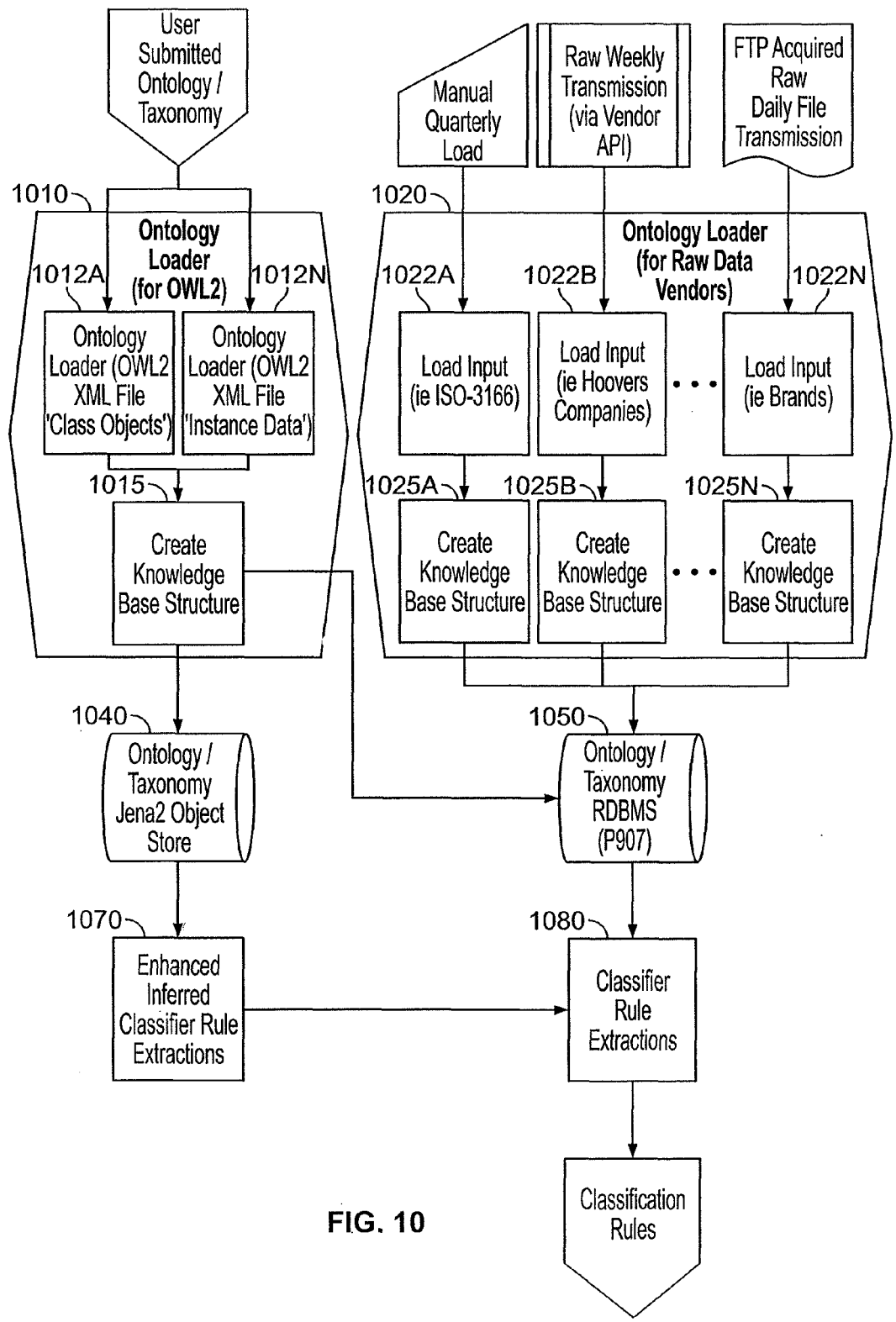
FIG. 10 is a flowchart depicting further details of one portion of the flowchart of FIG. 3.

Information is loaded into the knowledge base using the apparatus of FIGS. 9 and 10. The apparatus comprises an OWL2 ontology loader 1010, a raw data ontology loader 1020, an ontology/taxonomy store 1040, an ontology/taxonomy relational database management system (RDBMS) 1050, an enhanced inferred classifier rule extractor 1070, and a classifier rule extractor 1080. Loaders 1010, 1020 comprise a suite of load applications 1012A-N and 1022A-N that function as gateways for the acquisition of data from various information sources such as government agencies, commercial providers of business information and the like. The load applications conform to the source's interface specifications and understand the organization of the information that the providers make available. The information received at the gateways is then organized by processors 1015 and 1025A-N into normalized forms that can be incorporated into the knowledge base.

User submitted ontology and taxonomy information is provided as an input to the OWL2 ontology loader 1010. A variety of sources provide input to the raw data ontology loader 1020. Illustratively, for the case of a computer system that is dedicated to the processing of financial information, these sources might include Hoover's, Thomson-Reuters, Bloomberg, LexisNexis, Dunn & Bradstreet, S&P, etc. The sources might also include information provided as a result of government regulation such as the quarterly and annual reports available through the EDGAR system or the general business information available through the Commerce Department.

The general operation of the loader is to process arriving data sets to determine their impact on the data presently in the system and to transform the data into ADD/DELETE/CHANGE operations if the data is not already organized in such a format. (A CHANGE operation is a DELETE followed by an ADD). While incoming data sets frequently are organized in such format, not all data sets are so organized; and it becomes necessary to normalize the updates This normalization of the update streams makes it possible to sequentially apply a series of control operations into the load table (illustratively, LD_LOAD_INPUT_TBL). To determine what has changed from one day to the next, the prior day's snapshot of the knowledge base must be compared to the current day's snapshot. This is needed because the system only applies changes to the knowledge base and needs to know every vendor change to keep reclassification impacts to a minimum.

Preferably, each loader process presents data to the single LD_LOAD_INPUT_TBL table as a field associative table where each row in the table is a column of data in the data provider's record. These fields have an ID, Type, Range/Enumeration, and Description so that each field of a provider's record is auditable throughout its future use. The auditability of the data throughout the system makes it possible for corrections to be made if and when a data provider's input requires adjustment.

Details of loaders 1010 and 1020 are set forth in FIG. 9. The loader comprises inputs 905. 910 and two load tables LD_LOAD_INGEST_TBL and LD_LOAD_INPUT_TBL that have the same structure. Input 905 supports vendor application program interfaces (API) such as a weekly transmission of raw data. Input 910 supports a vendor flat file format such as an FTP acquired raw data daily file. Other inputs may also be used in the practice of the invention. At the beginning of the loading operation which illustratively is performed daily, the LD_LOAD_INGEST_TBL table is empty and the LD_LOAD_INPUT_TBL table contains a flat file representing the contents of the knowledge base.

Before data is loaded into the LD_LOAD_INGEST_TBL table, an audit trail is created. A LOAD_ID is created; the name of the data vendor supplying the data and a time stamp are associated with the LOAD_ID in an audit table; and the audit table is stored. The data from the vendor is then parsed to locate all known data fields and this information is loaded into the LD_LOAD_INGEST_TBL table. 915. The current day's image of the vendor's data is then created at step 920; and this image is compared at step 925 with what is in the LD_LOAD_INPUT_TBL table. If there are no differences, then LD_LOAD_INPUT_TBL table is left unchanged at step 930 and the loading operation terminates with respect to this data.

If there are differences, then a test is made at step 940 whether there are any explicit changes. As noted above a change comprises a delete followed by an add. If there are changes, then field-by-field change records are created at step 945, explicit delete records are created at step 950 and new change records are created at step 955 in the LD_LOAD_INPUT_TBL table. If there are no explicit changes, a test is also made at step 960 whether there are any implicit changes. An implicit change is one in which data has been removed from the previous day's data but no notice is given of its removal. If so, explicit delete records are created at step 980 in the LD_LOAD_INPUT_TBL table.

If there are changes, a test is made at step 965 whether there are explicit deletes. If there are no explicit deletes, a test is made at step 970 whether there are adds. If there are, new add records are created at step 975 in the LD_LOAD_INPUT_TBL table. Finally, if there are explicit deletes, explicit delete records are created at step 980 in the LD_LOAD_INPUT_TBL table.

At step 990 unprocessed records in the LD_LOAD_INPUT_TBL table are combined with the knowledge base. As shown in FIG. 10, the knowledge base is stored in either the ontology/taxonomy Jena2 Object Store 1040 or in the Ontology/Taxonomy RDBMS 1050.

Enhanced inferred classifier rule extractor 1070 and rule extractor 1080 create rules from the ontology by progressing through the nodes of the ontology following a route specified by a taxonomy. Rules are created by working node by node through a taxonomy, accessing the corresponding node in the ontology and bringing into the rule all the properties associated with those nodes in some small link neighborhood of the node. When the process is complete, the rules are indexed by their key words (essentially, all nouns) to create a Knowledge Base Rule Keyword Index (KBRKI) and the index and the rules are stored in the classifier rules database 262.

A classifier rule is considered a rule set of rule line items that are grouped into sections as denoted in the following example. The classifier rule is generated by traversing each identified node of an identified taxonomy as identified in the knowledge base rules generator configuration. Since each knowledge base taxonomy node is linked to a topic in the ontology and that topic is linked to other ontology nodes, rules may be extracted from the properties of any given topic by examining that topic's properties and all ontology nodes with a distance of 1 as identified by cross links. Each nearby ontology node's properties result in rule line items that are bracketed into sections so that each section's score contributes to the overall score assigned to a classification of a clustered set of messages. The FACET_INTERSECTION_WEIGHT for any section in a rule is tunable in the preferred embodiment and must be assigned for each section that is selected for inclusion into a rule for a given topic. Therefore, as a rule is generated it is:

done so in the context of its taxonomy;
known that comprising sections of the classification rule are drawn from a topic that is linked to the same, or different taxonomy, to form a facet intersection that has a system configured weight called the: FACET_INTERSECTION_WEIGHT that is added to the section of the rule that is in turn denoted by an ACCRUE ( ) operator;
combined with an existing rule if a topic is associated with more than one taxonomy to which the rule generator is being run; however, since the FACET_INTERSECTION_WEIGHT for that intersection may differ from the prior weight already added to the rule, its topic properties will be duplicated in the rule set but with different weights for the section/rule line items added.

Figure 11:
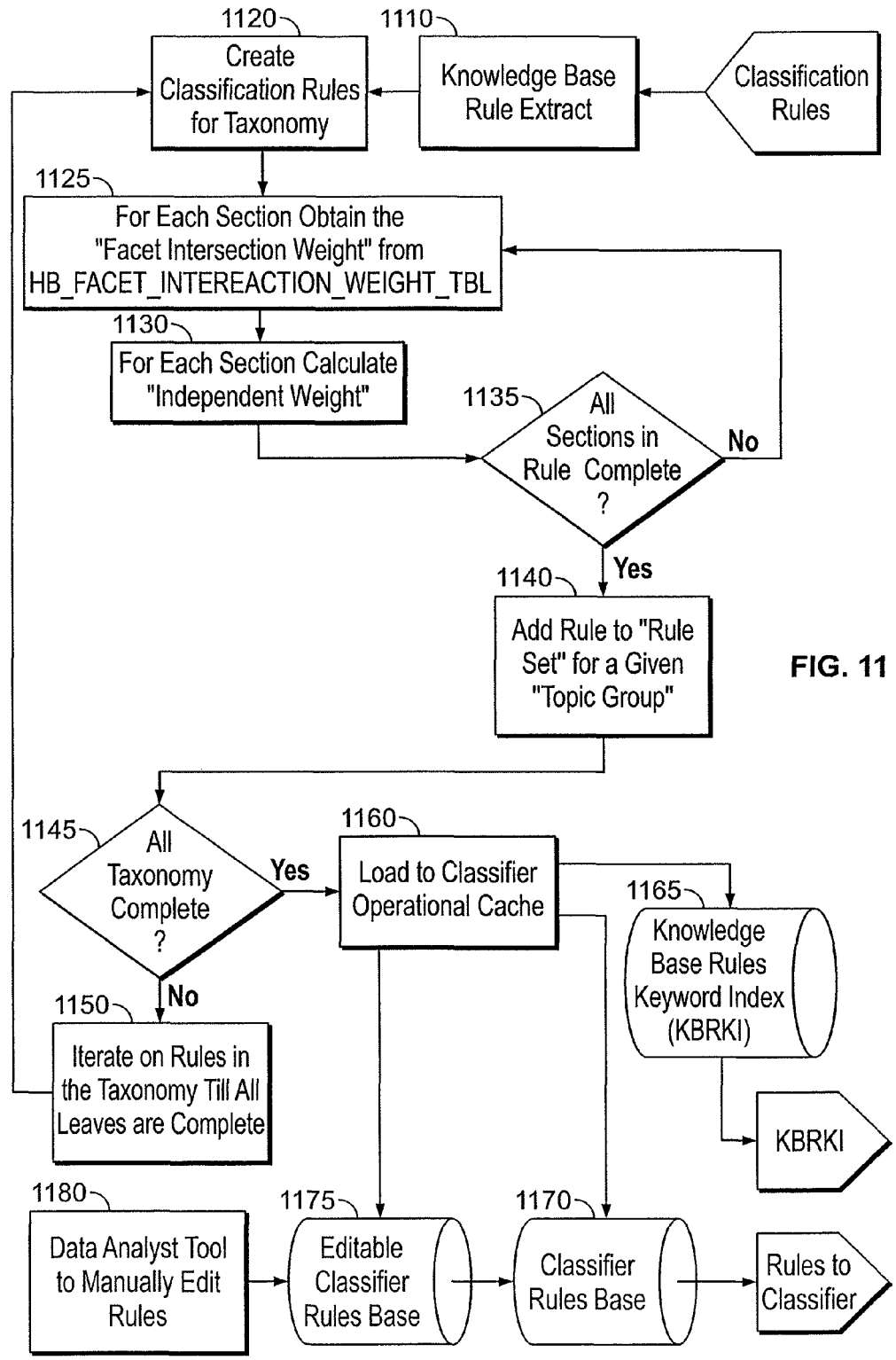
FIG. 11 is a flowchart depicting further details of an illustrative embodiment of another portion of the flowchart of FIG. 3.

The rule generation process is described more fully in FIG. 11. The knowledge base is represented in FIG. 11 as element 1110. To create a rule, it is traversed following a taxonomy. The process of rule generation begins at step 1120. In this process, two weights are used: W1 or the FACET_INTERSECTION_WEIGHT and W2 or the INDEPENDENT_SECTION_WEIGHT. At step 1125, W1 for a section of the rule is retrieved from a table (illustratively, the HB_FACET_INTERSECTION_TBL table). A test is then made at step 1130 whether W1 has been retrieved for all sections of the rule. If not, the process returns to step 1125 and retrieves W1 for the next section of the rule. When W1 has been retrieved for all sections S of the rule, the process then computes W2 for each section i where (refer to Equation [4] below):

$$W2i = (W1i/(\text{SUM}(W1j \text{ for all } j \text{ in } S)))*(1-\text{MAX}(W1k, \text{ for all } k \text{ in } S)) \quad \text{Equation [4]}$$

The relevancy or likelihood that the rule is true is dependent on which section's conditions are met and is then calculated using the formula (refer to Equation [5] below):

$$\% \text{ Relevancy} = \text{MAX}(\text{score}i \times W1i, \text{ for all } i \text{ in } S) + \text{SUM}(\text{score}j \times W2j, \text{ for all } j \text{ in } S)) \quad \text{Equation [5]}$$

Thus, the INDEPENDENT_SECTION_WEIGHT represents the portion that each section may contribute to the overall rule support, independent of any support offered by other sections, and the FACET_INTERSECTION_WEIGHT represents the portion of support for the rule to which one or more sections may contribute non-accumulatively.

At step 1145 a test is made whether the taxonomy is complete. If it is not, at step 1150 the process moves to the next node in the ontology that is linked to the taxonomy and returns to step 1120 to create the next rule.

If the taxonomy has been fully traversed, the classifier operational cache is loaded at step 1160. The knowledge base rules keyword index (KBRKI) is generated and stored at step 1165 in the knowledge base 262. As its name suggests, the KBRKI is a keyword index to all the rules that are generated. Illustratively, the keywords are all the nouns and noun phrases used in the rules. In addition the KBRKI also contains a count of the number of times each noun appears in a given rule, as well as the number of times it appears in the rule set in its entirety. The classifier rules base is generated and stored at step 1170 in the classifier rules database 263. An editable classifier rules base is generated and stored at step 1175. This rules base may be manually edited at step 1180 using an appropriate data analyst tool.

The following example of a classification rule illustrates the rule generation process where the weights are illustrative.

The company topic node for AIG (the company) is acquired by traversing the COMPANY-COMPANY taxonomy facet. All properties of the company topic node are queried from the database to produce rule sections for alternative items such as company name, alternative company name, and company descriptions. This section carries a FACET_INTERSECTION_WEIGHT of 70 resulting in an INDEPENDENT_SECTION_WEIGHT of 21

The geographic topic node for NY and DC, respectively, are acquired since they are of distance=1 from AIG (the company) topic node and identified as a member of the COMPANY-GEOGRAPHY taxonomy facet. These are grouped since they are of the same type and associated with the company.

Likewise, the property parent company topic node for AIG (the company) is acquired and identified as a member of the COMPANY-COMPANY taxonomy facet; with it the algorithm for extraction of rules is applied to the parent company just as it is for the child company node.

The ticker topic node for AIG (AIG US Equity) is acquired since it of distance=1 from AIG (the company) topic node and identified as a member of the TICKER-COMPANY taxonomy facet that carries a FACET_INTERSECTION_WEIGHT of 20 resulting in an INDEPENDENT_SECTION_WEIGHT of 6.

People topic nodes of distance=1 from AIG (the company) are next acquired and grouped since they are identified as a members of the PEOPLE-COMPANY taxonomy facet. They carry a FACET_INTERSECTION_WEIGHT of 10 resulting in an INDEPENDENT_SECTION_WEIGHT of 3.

The classification rule is as follows (note: weights are illustrative):

```
|~CLASSIFICATION_RULE {   /* COMPANY_TAXONOMY RULE SECTION */
        ~TICKER_TG {   /* TICKER( AIG ) TICKER TOPIC RULE SECTION */
            ACCRUE/3 {
                EXACT/1( "AIG" )
                NEAR/3( "AIG", "US", "Equity" )
                NEAR/2( "AIG", "US" )
            }
        } ~TICKER TG; FACET_INTERSECTION WEIGHT=20, INDEPENDENT_SECTION_WEIGHT=6
|~COMPANY_TG {   /* COMPANY_TOPIC RULE SECTION */
            /* The AIG Company name itself at this time! */
            ~PRIMARY_COMPANY_NAME_TG {  /* Primary COMPANY_NAME */
                ACCRUE/2 {
                    NEAR/4( "American", "International", "Group", SYNONYM( "Inc" ) )
                    ACUM/4( "American", "International", "Group" )
                }
            } ~PRIMARY COMPANY NAME TG WEIGHT=20
            OR
            ~ALTERNATIVE_COMPANY_NAME_TG {  /* Alternative COMPANY NAMES */
                ACCRUE/7 {
                    {
                      /* COMPANY_NAME( 1 ) - alternative name */
                        NEAR/3( "AMER", "GENL", SYNONYM( "CORP" ) )
                        ACUM/3( "AMER", "GENL" )
                    } WEIGHT=15
                    OR
                    {
                      /* COMPANY_NAME( 2 ) - alternative name */
                        NEAR/3( "AIG", "LIFE", "HOLDINGS", "US", SYNONYM( "INC" ) )
                        ACUM/3( "AIG", "LIFE", "HOLDINGS", "US" )
                    } WEIGHT=15
                    OR
                    {
                      /* COMPANY_NAME( 3 ) - alternative name */
                        NEAR/3( "AMERICAN", "GENERAL", SYNONYM( "CORP" ) )
                        ACUM/3( "AMERICAN", "GENERAL" )
                    } WEIGHT=14
                    OR
                    {
                      /* COMPANY_NAME( 4 ) - alternative name */
                        NEAR/3( "American", "General", SYNONYM( "Corp" ) )
                        ACUM/3( "American", "General" )
                    } WEIGHT=14
                    OR
                    {
                      /* COMPANY_NAME( 5 ) - alternative name */
                        NEAR/3( "AMER", "INTL", "GROUP" )
                    } WEIGHT=14
                    OR
                    {
                      /* COMPANY_NAME( 6 ) - alternative name */
                        NEAR/3( "AMERICAN", "INTL", "GROUP" )
                    } WEIGHT=14
                    OR
                    {
                      /* COMPANY_NAME( 7 ) - alternative name */
                        NEAR/3( "AIG", "American", "International", "Group" )
                    } WEIGHT=14
                } WEIGHT=100
            } ~ALTERNATIVE COMPANY NAME TG WEIGHT=35
            OR
```

```
~GEOGRAPHY_TG {   /* GEOGRAPHY TOPIC RULE SECTION
                (Obtained by Cross Link) */
    ACCRUE/4 {
        ACCRUE/3 {  /* Geography Country of Operations */
            EXACT/1( "US" )
            NEAR/4( "United", "States", "of", "America" )
            NEAR/4( SYNONYM( "US" ) )
        } WEIGHT=25
        { /* COMPANY_GEO_CNTRY_ISO */
            EXACT/1( "US" )
        } WEIGHT=25
        ACCRUE/2 {  /* COMPANY_GEO_ST_DOMICILE */
            EXACT/1( "NY" )
            NEAR/2( "New", "York" )
        } WEIGHT=25
        ACCRUE/2 {  /* COMPANY_GEO_ST_INCORPORATED */
            EXACT/1( "DE" )
            NEAR/2( "Delaware" )
        } WEIGHT=25
    } WEIGHT=100
} ~GEOGRAPHY TG WEIGHT=5
OR
~COMPANY_DESC_TG {   /* COMPANY DESCRIPTION TOPIC RULE SECTION
        American International Group, Inc., through its subsidiaries, provides
        insurance and related services in the United States and internationally.
        It operates in four segments: General Insurance, Domestic Life Insurance
        and Retirement Services, Foreign Life Insurance and Retirement Services,
        and Financial Services. The General Insurance segment provides property
        and casualty insurance, as well as various personal lines. The Domestic
        Life Insurance and Retirement Services segment offers life insurance
        products that include a range of protection products comprising individual
        term and universal life insurance, and group life and health products;
        payout annuities that consist of single premium immediate annuities,
        structured settlements, and terminal funding annuities; and group
        retirement products, and individual fixed and variable annuities. The
        Foreign Life Insurance and Retirement Services segment provides insurance
        and investment-oriented products, such as whole and term life, investment
        linked, universal life and endowments, personal accident and health
        products, and fixed and variable annuities, as well as group products,
        including pension, life, and health. The Financial Services segment
        engages commercial aircraft and equipment leasing, capital markets
        operations, consumer finance, and insurance premium financing. American
        International Group also provides reinsurance products. The company was
        founded in 1967 and is based in New York, New York. */
    ACCRUE/3 {
        ACUM/6( "provides", "insurance" )
            ACCRUE/1 {
                ACUM/4( "General", "Insurance"
                    ACUM/4( "property", "and", "casualty", "insurance" )
                    ACUM/2( "personal", "lines" )
            } WEIGHT=34
            ACCRUE/1 {
                ACUM/7( "Domestic", "Life", "Insurance",
                        "and", "Retirement", "Services")
                    ACUM/4( "life", "insurance", "products"
                        ACUM/14( "range", "of", "protection", "products"
                        ACUM/2( "individual", "term" )
                        ACUM/3( "universal", "life", "insurance" )
                        ACUM/2( "group", "life" )
                        ACUM/2( "health", "products" )
                        ACUM/3( "payout", "annuities" )
                            ACCRUE/1 {
                                ACUM/4( "single", "premium",
                                        "immediate", "annuities" )
                            }
                        ACUM/2( "structured", "settlements" )
                        ACUM/3( "terminal", "funding", "annuities" )
                        ACUM/2( "group", "retirement", "products" )
                        ACUM/3( "individual", "fixed", "annuities" )
                        ACUM/2( "variable", "annuities" )
                    )
                )
            } WEIGHT=33
            ACCRUE/1 {
                ACUM/4( "Foreign", "Life", "Insurance"
                    ACCRUE/1 {
                        ACUM/6( "insurance", "and", "investment",
                                "oriented", "products"
```

```
                            ACCRUE/9 {
                                ACUM/2( "whole", "life" )
                                ACUM/2( "term", "life" )
                                ACUM/4( "investment", "linked", "universal",
                                            "life" )
                                ACUM/3( "investment", "linked", "endowments" )
                                ACUM/2( "personal", "accident" )
                                ACUM/2( "health", "products" )
                                ACUM/2( "fixed", "annuities" )
                                ACUM/2( "variable", "annuities" )
                                ACUM/3( "group", "products"
                                    ACCRUE/3 {
                                        EXACT/1( "pension" )
                                        EXACT/1( "life" )
                                        EXACT/1( "health" )
                                    }
                                )
                            }
                        )
                    }
                ) WEIGHT=33
            } WEIGHT=33
        } WEIGHT=33
    ACCRUE/3 {
        ACUM/3( "Retirement", "Services")
            ACCRUE/1 {
                ACUM/3( "Financial", "Services")
                    ACCRUE/5 {
                        ACUM/3( "commercial", "aircraft", "leasing" )
                        ACUM/2( "equipment", "leasing" )
                        ACUM/3( "capital", "markets", "operations" )
                        ACUM/2( "consumer", "finance" )
                        ACUM/3( "insurance", "premium", "financing" )
                    }
                        )
                    }
                    ACUM/2( "reinsurance", "products"" )
                )
            } WEIGHT=33
            ACCRUE/2 {
                ACUM/3( "founded", "in", DATE( "1967" ) )
                ACUM/4( "based", "in", SYNONYM( NY ), SYNONYM( "NY" ) )
            } WEIGHT=33
        }
    } ~COMPANY DESC TG WEIGHT=5
    ~PARENT_COMPANY_TG {   /* PARENT COMPANY TOPIC RULE SECTION */
        /* The United States of America ... literally owns AIG at this time! */
        { /* Parent COMPANY_NAME( 0 ) */
            ACCRUE/2 {
                NEAR/4( SYNONYM( "United", "States", "of", "America" ) )
                ACUM/4( SYNONYM( "United", "States", "of", "America" ) )
            } WEIGHT=100
        } ~PARENT COMPANY NAME TG WEIGHT=40
        OR
        ~PARENT_COMPANY_ALT_NAMES_TG { /* Alternative COMPANY NAMES( 1..5 ) */
            ACCRUE/5 {
                /* COMPANY_NAME( 1 ) - alternative name */
                ACCRUE/1 {
                    EXACT/1( "USA" ) )
                } WEIGHT=20
                ACCRUE/2 { /* COMPANY_NAME( 2 ) - alternative name */
                    NEAR/3( "UNITED", "STATES", "OF", "AMERICA" )
                    ACUM/4( "UNITED", "STATES", "OF", "AMERICA" )
                } WEIGHT=20
                ACCRUE/1 { /* COMPANY_NAME( 3 ) - alternative name */
                    WILDCARD/1( "**UNITED STATES" )
                } WEIGHT=20
                ACCRUE/2 { /* COMPANY_NAME( 4 ) - alternative name */
                    NEAR/3( "UNITED", "STATES", ACUM/2( "GOVT", "OF" ) )
                    ACUM/4( "UNITED", "STATES", "GOVT", "OF" )
                } WEIGHT=20
                ACCRUE/2 { /* COMPANY_NAME( 5 ) - alternative name */
                    NEAR/4( "Government", "of", "United", "States" )
                    ACUM/4( "Government", "of", "United", "States" )
                } WEIGHT=20
            } WEIGHT=100
        } ~PARENT COMPANY ALT NAMES TG WEIGHT=55
        ~PARENT_COMPANY_GEOGRAPHY_TG {   /* GEOGRAPHY TOPIC RULE SECTION for
Parent
```

```
                    ( Obtained by Cross Link ) */
                { /* Parent COMPANY_GEO_CNTRY_ISO */
                    EXACT/1( "US" )
                } WEIGHT=70
                { /* COMPANY_GEO_ST_DOMICILE */
                ACCRUE/2 {
                    EXACT/1( "DC" )
                    NEAR/3( "District", "of", "Columbia" ) )
                } WEIGHT=30
            } ~PARENT COMPANY GEOGRAPHY TG WEIGHT=5
        } ~PARENT COMPANY TG WEIGHT=5
    } ~COMPANY TG; FACET_INTERSECTION WEIGHT=70, INDEPENDENT_SECTION_WEIGHT=21
    ~PEOPLE_TG {   /* PEOPLE TOPIC RULE SECTION */
        ACCRUE/5 {
            ACCRUE/3 {
                ACUM/4( TITLE( "Mr." ), FIRSTNAME( "Robert" ),
                    MIDDLE( "H." ), LASTNAME( "Benmosche" ) )
                ACUM/4( "Chief", SYNONYM( "Exec" ), SYNONYM( "Officer" ) )
                ACUM/1( SYNONYM( "Pres" ) )
            }
            ACCRUE/2 {
                ACUM/4( TITLE( "Mr." ), FIRSTNAME( "David" ),
                    MIDDLE( "L." ), LASTNAME( "Herzog" ) )
                ACUM/4( SYNONYM( "Chief" ), SYNONYM( "Financial" ),
                    SYNONYM( "Officer" ), SYNONYM( "Exec.", SYNONYM( "VP" ) )
            }
            ACCRUE/2 {
                ACUM/4( TITLE( "Mr." ), FIRSTNAME( "Kristian" ),
                    MIDDLE( "P." ), LASTNAME( "Moor" ) )
                ACCRUE/4 {
                    ACUM/6( SYNONYM( "Exec." ), SYNONYM( "VP" ), "of",
                        "Domestic", SYNONM( "Gen." ), "Insurance" )
                    ACUM/7( SYNONYM( "Exec." ), SYNONYM( "VP" ), "of",
                        "AIG", "Property", "Casualty", "Group" )
                    ACUM/5( SYNONYM( "Pres" ), "of", "AIU", " Holdings", "Inc" )
                    ACUM/5( SYNONYM( "Pres" ), "of", "Domestic", "Brokerage" )
                }
            }
            ACCRUE/2 {
                ACUM/4( TITLE( "Mr." ), FIRSTNAME( "Nicholas" ),
                    MIDDLE( "C." ), LASTNAME( "Walsh" ) )
                ACCRUE/2 {
                    ACUM/6( SYNONYM( "Exec." ), SYNONYM( "VP" ), "of",
                        "Foreign", SYNONYM( "Gen." ), "Insurance" )
                    ACUM/6( SYNONYM( "Vice" ), SYNONYM( "Chairman" ), "of",
                        "AIU", "Holdings", SYNONYM( "Inc" ) )
                }
            }
            ACCRUE/2 {
                ACUM/5( TITLE( "Mr." ), FIRSTNAME( "Rodney" ),
                    MIDDLE( "O." ), LASTNAME( "Martin",
                    SUFFIXNAME( SYNONYM( "Jr." ) ) ) )
                ACUM/5( SYNONYM( "Exec." ), SYNONYM( "VP" ), "of",
                    "Life", "Insurance" )
            }
        }
    } ~PEOPLE TG; FACET_INTERSECTION WEIGHT=10, INDEPENDENT_SECTION_WEIGHT=3
} ~CLASSIFICATION RULE WEIGHT=100=20+70+10
```

Figure 12:
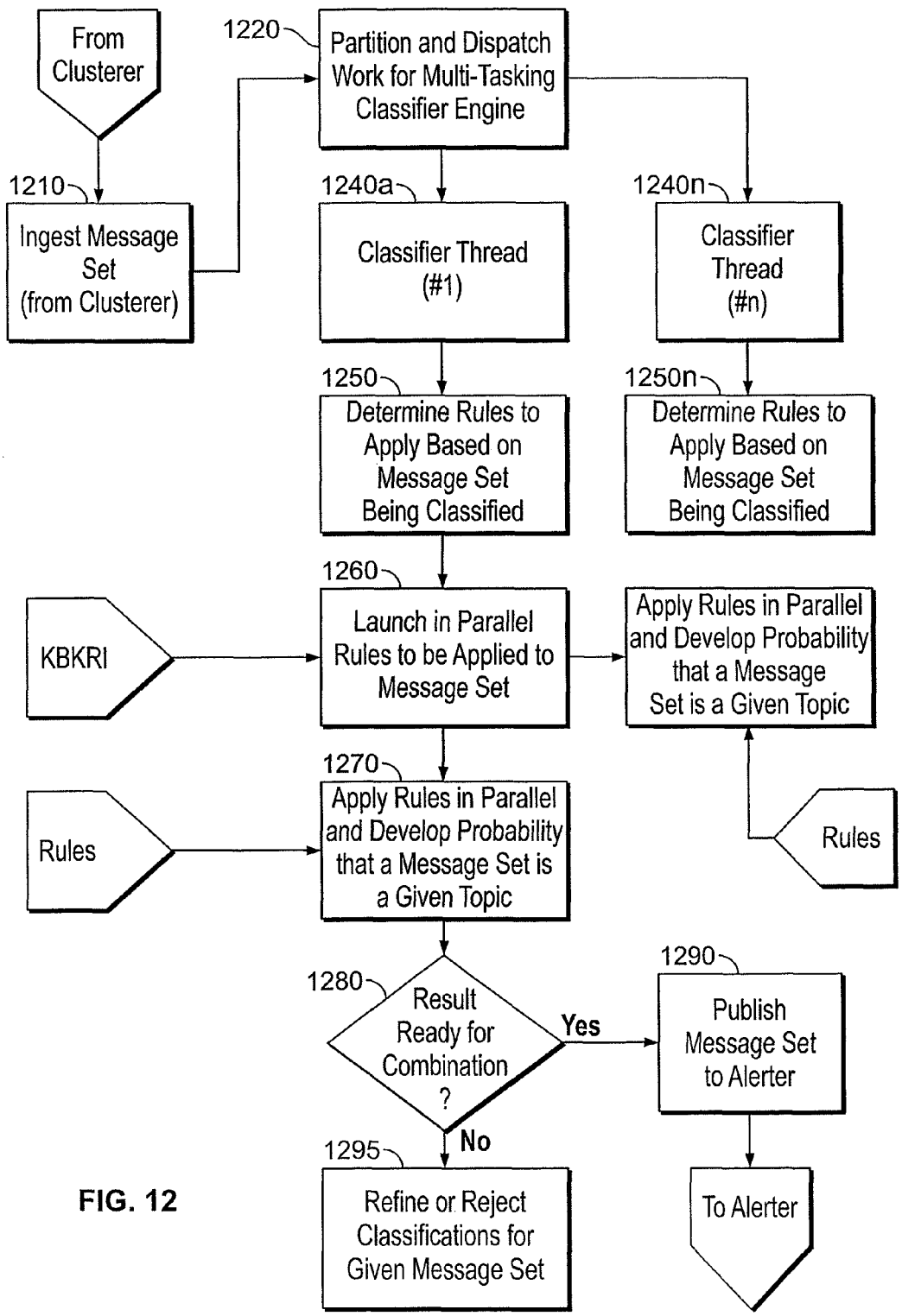
FIG. 12 is a flowchart depicting further details of an illustrative embodiment of another portion of the flowchart of FIG. 3.

As shown in FIG. 12, classifier 330 performs the following operations. It receives incoming message sets from the clusterer at step 1210, selects at step 1220 a set of classification rules to be applied to each message set, and classifies each message set at step 1230. Step 1230 is typically performed in parallel over a large number of classification threads 1240a-n. In each thread 1240i, the classification rule or rules to be applied are determined at step 1250i; the rules are launched at step 1260i; and a probability (or relevancy) is developed at step 1270i for that particular rule or rules that a message set relates to a specific topic. At step 1280, a test is made whether the result of the classification rules in thread 1240i is ready for combination with the results computed in the other threads. If it is, the results of the various classification threads are ranked in descending order of relevancy; and the ranking of message sets is published at step 1290 to the alerter step 340. If it is not, the classifications for the message set are refined or rejected at step 1295

As indicated above, the message sets that are received at step 1210 include the tokens of the text messages in the message set and metadata that contains noun and noun phrases that have been identified within the message set and have high IDF values. The specific classification rules to be used in classifying a message set are selected at step 1250i by using each token in the message set to retrieve from the KBRKI the identification of the rule or rules that reference that token. The rule or rules so identified at step 1250i are then launched at step 1260i to determine at step 1270i relevancies under which the message set relates to various specific topics. Note that not all nouns of the message set will have rules but this is not of consequence to the embodied system because those nouns would never have resulted in a relevant classification.

Figure 13:
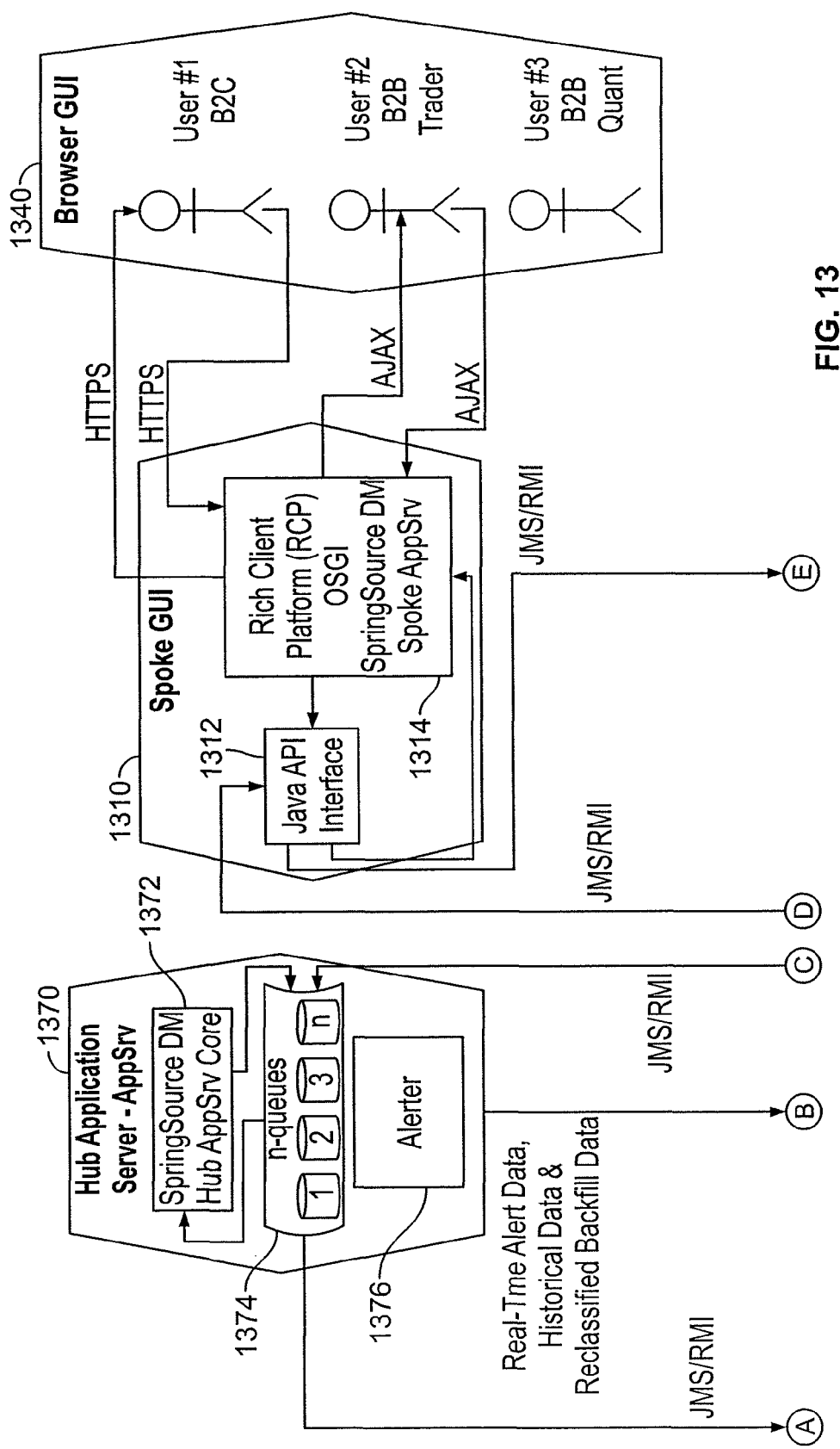
FIG. 13 is a block diagram of a user interface of an illustrative embodiment of the invention.
Figure 13:
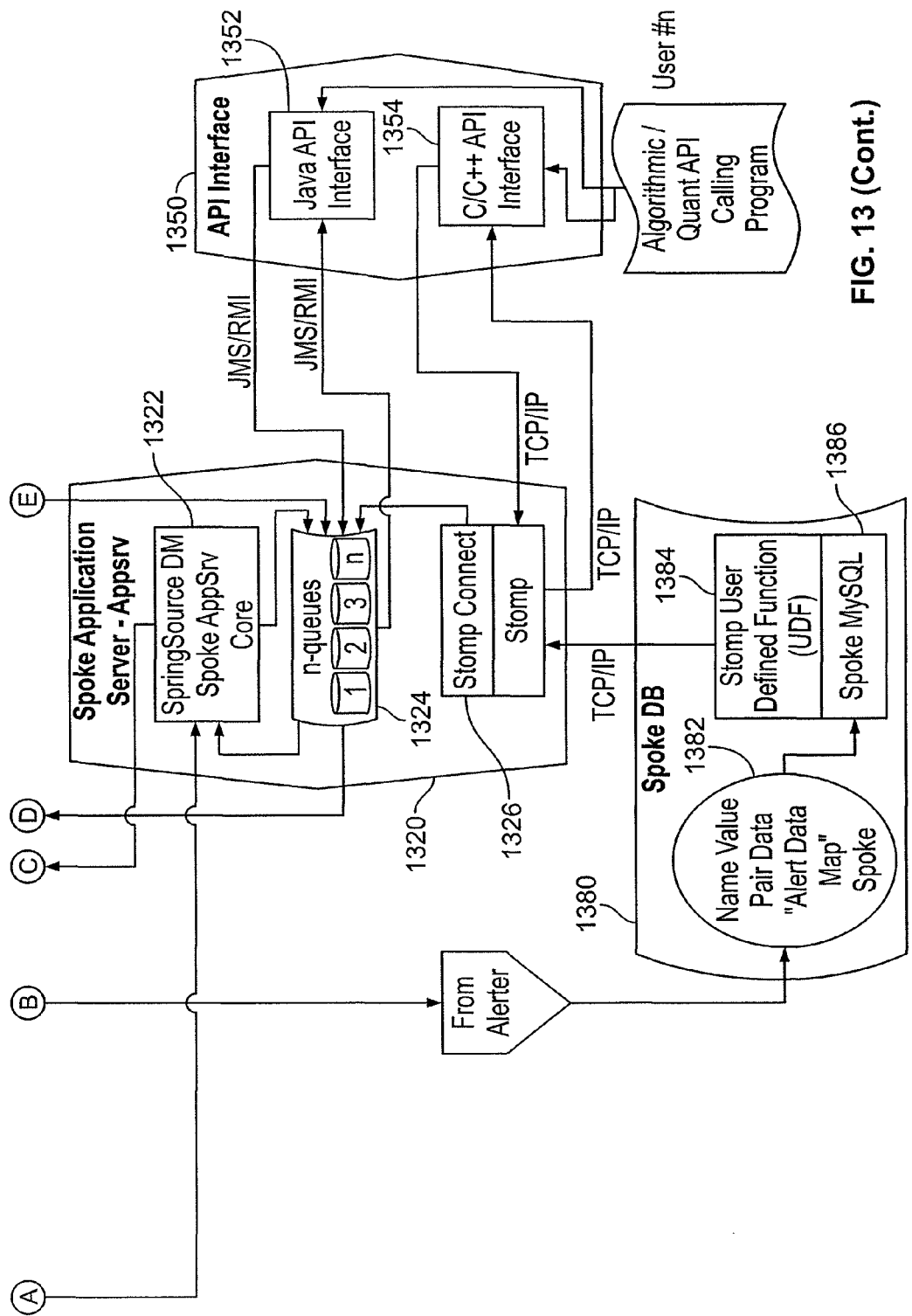

FIG. 13 is a block diagram depicting an illustrative embodiment of the user interface employed in the practice of the invention. The user interface comprises a graphical user interface (GUI) 1310, an application server 1320, a browser graphical user interface (GUI) 1340, an API interface 1350, a database 1380 and a hub application server 1370.

Graphical user interface 1310 comprises a Java API interface 1312 and a rich client platform 1314. Application server 1320 comprises an application server core 1322, memory databases 1324, and a Stomp connection interface 1326 to relational database 1380.

Browser GUI 1340 provides browser access to GUI 1310 for a plurality of users using various communication protocols. API Interface 1350 comprises a Java API interface 1352 and a C/C++API interface 1354.

Spoke database 1380 comprises a name value pair data alert data map 1382, MySQL database 1386 and a Stomp user defined function 1384 running in the My SQL database 1386. The Alert data map 1382 enables arbitrary social media data to be provided to the end user. Arriving data is placed in the MySQL database from which it can be supplied to the user defined function running in the database.

Hub application server 1370 comprises an application server core 1372, databases 1374 and alerter 1376.

The format of alert and search criteria is the same. Each request includes a Boolean combination of topic groups of interest, a topic group relevancy class, an interval duration, a requested time period, volume and sentiment thresholds and baseline type. The criteria may also include free text. Illustrative GUI screens for making these requests are depicted in FIGS. 15D-15L.

The topic groups of interest are a specification of the search or alert subject indicated as a Boolean combination of available topics. This Boolean combination is received by an alert request processor 1472 (FIG. 14) in disjunctive normal form (DNF); that is, the Boolean expression is set forth as a disjunction of conjunctive clauses. In DNF the Boolean operators are limited to AND, OR and NOT. The available topics are those stored in the system's knowledge base (or ontology) that is described above in conjunction with FIGS. 9, 10 and 17.

The topic group relevancy class specifies the minimum acceptable relevancy class for the message sets that will provide the response to the specified topic group request. As described above, the relevancy class is a range of probabilities that the topic specified by the topic group of interest is being discussed in the text messages comprising a message set. Illustratively, four classes may be specified:

V (Very High Topic Group Relevancy (95 to 100% probability));
H (High (90 to 95%));
M (Moderate (80 to 90%)), and
L (Low (60 to 80%)).

Interval duration specifies for the message sets that will provide the response to the topic group request the time period (or granularity) over which messages were clustered. For the system described above, this time period ranges, illustratively, from one minute to one year.

The requested time period specifies the time period for which message sets are to be examined in response to the topic group request. The time period determines whether the topic group request is a search or an alert. For any time period up to the present, the request is a search. Any request that is current or prospective is an alert.

The volume threshold specifies a deviation from expected/baseline activity levels relating to the topic group that is the subject of the request. Similarly, the sentiment threshold specifies a deviation from expected/baseline sentiment levels in the message sets that are to provide the response to the topic group request. Baseline type specifies how the reference baselines for these thresholds are to be calculated. For example, they may be simple moving averages. Illustratively, the deviation from expected baseline is determined by the following equation:

$$\text{deviation} = ((A2-E2)-(A1-E1))/t \qquad \text{Equation [6]}$$

where
A2 is the volume of activity (or sentiment value) in the current time interval,
A1 is the volume of activity (or sentiment value) in the immediately preceding time interval,
E2 is the expected volume of activity (or sentiment value) in the current time interval,
E1 is the expected volume of activity (or sentiment value) in the immediately preceding time interval and
t is the time interval in minutes.

Illustratively, the expected value is a projection of a moving average from the last point at which it was measured. Illustratively, in the case of volume, deviations in the range of =10 to −10 are regarded as a conversational level of interest about the topic, deviations in the range between +10 and +25 are regarded as an elevated level of interest, deviations above +25 are regarded as a viral level of interest; deviations in the range of −10 to −25 are regarded as faded; and deviations below −25 are regarded as muted.

Free text alert requests are received by a hub application server 1470 (FIG. 14) and stored as administration requests in hub database 260 as future topic group additions to ontology 1840 (FIG. 17), described above in conjunction with FIGS. 9, 10 and 17.

The response to a topic group request includes an alert ID that links the response to the request that was made, the interval duration to which the response pertains, a volume value and a sentiment value for the message sets which constitute the response to the topic group request, the volume baseline and sentiment baseline, a listing of other topic group IDs associated with the message sets that are responsive to the topic group request, and sample messages from these message sets. The complete message sets themselves are not supplied in response to a topic group request because of their volume; but they are available for inspection if desired. The listing of other topic group IDs is ranked by topic group relevancy from highest to lowest value; and the list is cutoff at some point, illustratively 60%. An illustrative email response to an alert request is set forth in FIG. 15M and discussed below.

A significant feature of the user interface is the user's ability to drill down to what is necessary by navigating 'facets' of knowledge known to the knowledge base and adding that criteria to a disjunctive normal form (DNF) boolean expression that is being built up part of the process started when one wishes to create or edit an 'alert/request criteria.'

The following section describes how the user is helped in deriving a search query. A user always starts by picking an item from the first level drop-down in the FIG. 18A. The drop down items can be retrieved using the API: dmTaxonomyGetRequest, passing in null value for the 'startTaxonomyNode'

Once the user selects an item, for example, say the user has selected "GICS"), the value is sent back to the spoke using the API: dmTaxonomyGetRequest. The API's callback (dmTaxonomyGetRequestCallBack) provides a list of related taxonomies to the user and a facet ID for the selected taxonomy i.e. "GICS". The callback function also provides a facet-GroupID to distinguish between different facet reductions the same user is doing in parallel using multiple browsers or tabs. The user can either select from the returned list or start typing his/her search. As the user types in the string, it should produce an auto complete list using the 'incomplete string' typed in so far in relation to the already selected 'taxonomy'.

FIG. 18B shows the initial list available to the user without anything typed in; However, FIG. 18C shows the user ignoring the list provided to him and starting to type 'oil'. This pulls down all the taxonomies starting with 'oil*' and related to the already selected term "GICS". The API used for this is, dmTaxonomyNodeSearchRequest. One of the inputs to this API is the priorFacetID as that of "GICS". The user should also be able to provide the boolean operator and negation requirement for this, using the toggle buttons specified in the figure (right most part of the box). For example if the user selected '^' and 'empty negation', it means, he requires matching results for <"OIL*" and 'GICS'>. This API's callback (dmTaxonomyNodeSearchRequestCallBack) function will return a list of matching taxonomies.

The steps: of the immediately preceding two paragraphs may be iteratively applied to the new set and continued.

The user also has the option to choose a prior facet ID along with which the new typed in string will be associated using the boolean operators to produce a new result set. For example, see FIG. 18D where the user has already selected 3 levels of hierarchy. Currently he is in the process of selecting the 4th level. But for the 4th level he wants to select all the taxonomies related to the string he types in and 'the level 1's facet ID' coupled using the boolean operation. The way he should be able to do it is by clicking on the left (or right arrow) on the current type in box and align it with the level he wants the current text to be coupled. The API dmTaxonomyNodeSearchRequest should be called with the priorFacetID as that of level 1 and not level 3. The FIG. 18E shows the box positions after user actions after the previous step. The user should also be able to completely pull the box to the left to start the search as new, similar to the step 2.

If the user wants to delete a taxonomy selected, then he should be able to do so by clicking on a delete button (cross button) on the input box. This should clear out the sub-tree from that box including that one. FIG. 18F and FIG. 18G shows the before and after steps for this. The above step is done using the API: dmTaxonomyFacetClear The following points discuss how the facet reduction is tracked and used in the spoke back-end: A tree, with nodes consisting of the following elements is created

Figure 14:
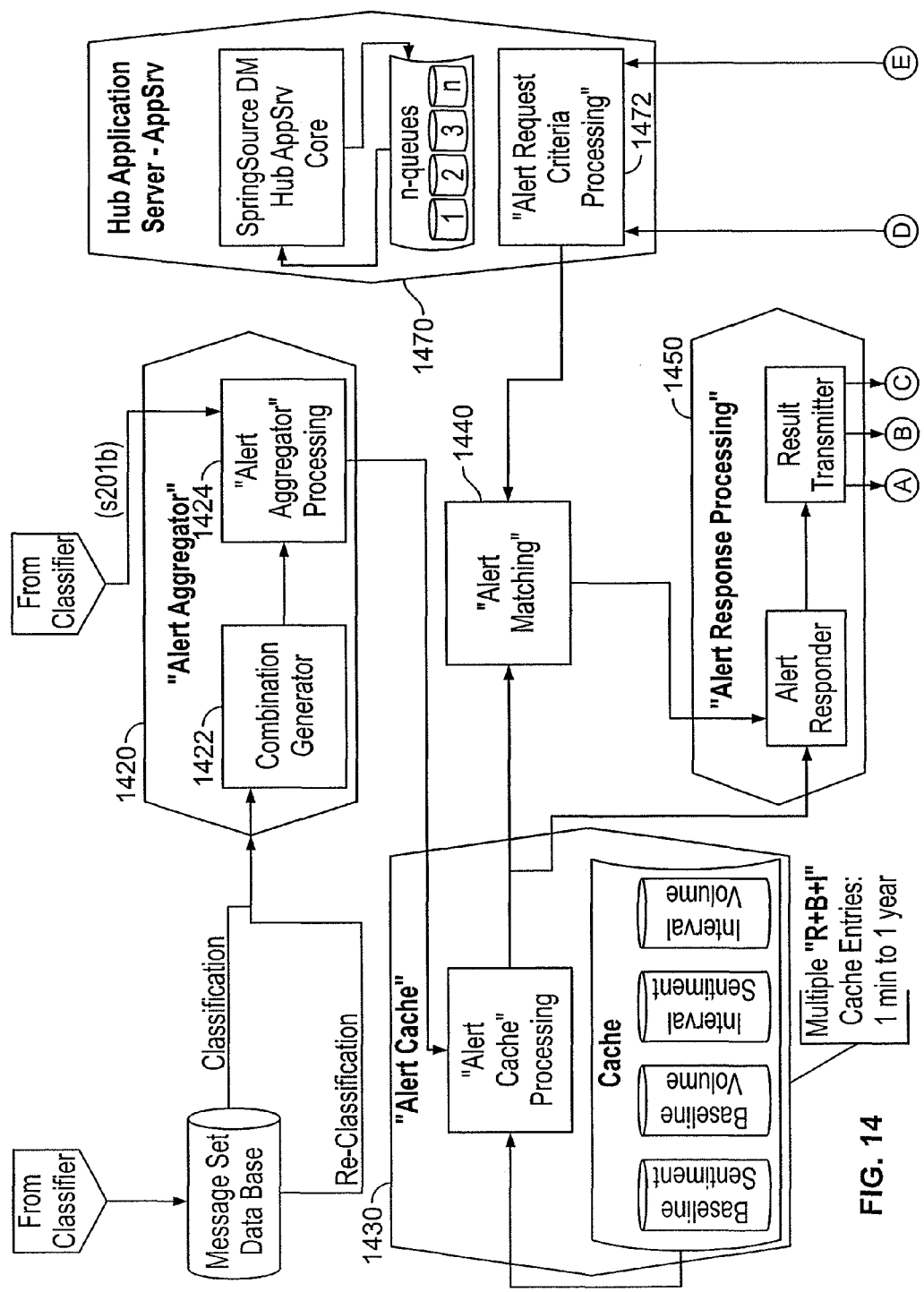
FIG. 14 is a flowchart depicting further details of one portion of the flowchart of FIG. 3.
Figure 14:
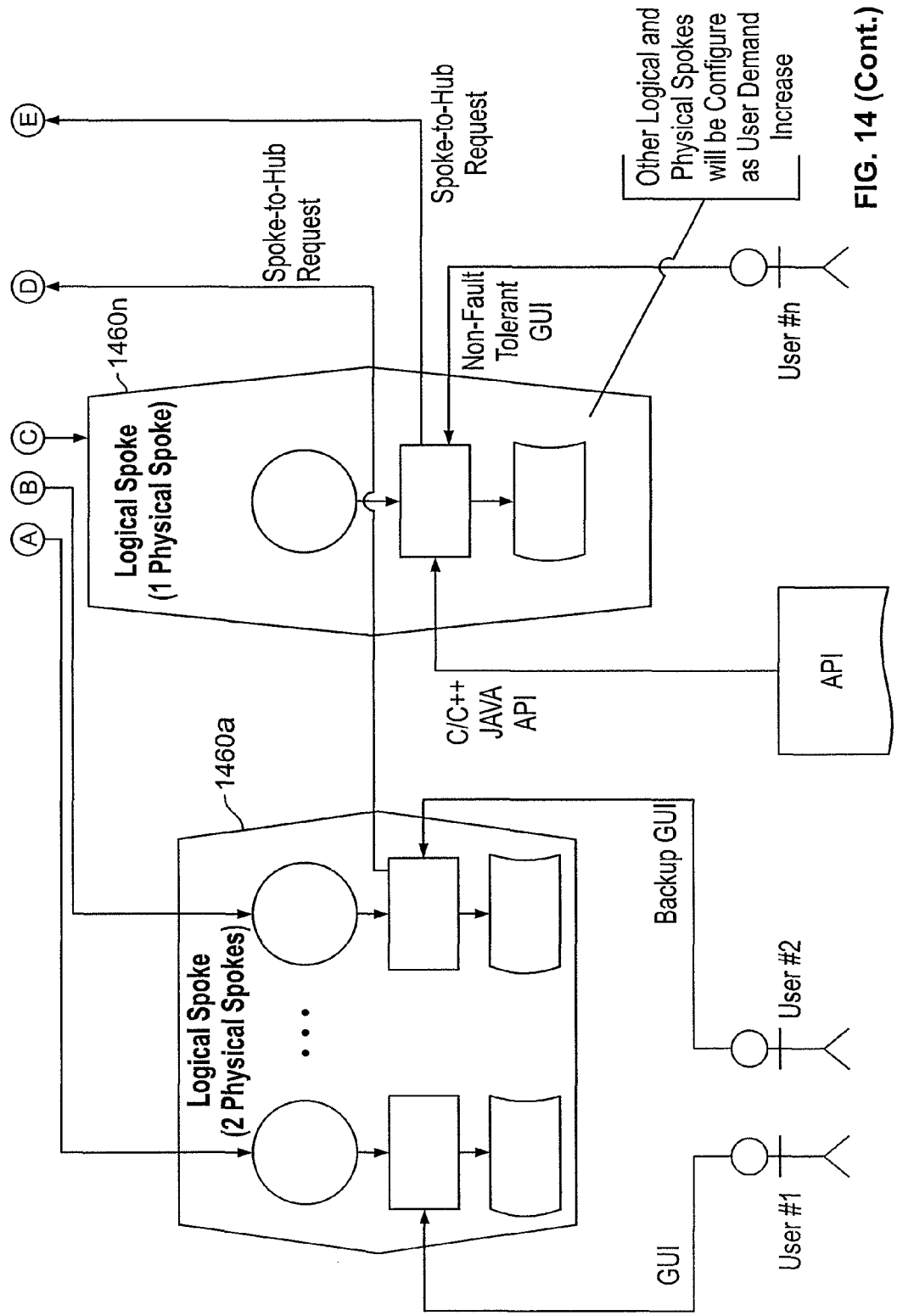

- Facet ID, Taxonomy node ID, Parent Facet, Left sibling Facet, Right sibling Facet, Boolean Operation, Negation;
- The facet reduction APIs control the addition, removal and editing of the nodes in the tree;
- Once the user has fixed the alert search criteria after the facet reduction, the entire tree, as a serializable object is written into the 'FACET_GROUP_EXPRESSION' of the table 'SP_USR_ALRT_TRACK_TBL';
- The leaves of the tree represent the actual terms participating in the user search query;
- The way they are grouped using boolean operators depends on the least common ancestors' sub-trees boolean operation grouping;
- The FIG. 18H describes on such grouping;
- The resulting sub-trees boolean expression is reduced to DNF and stored as ALERT_EXPRESSION in SP_USR_ALRT_TRACK_TBL table;

FIG. 14 depicts the processing of a topic group request. The text message processing system whose operation has been described in conjunction with FIGS. 3-12 is represented schematically as element 1410. Its output is provided to an expander 1420, an alert cache 1430, an alert matcher 1440, and an alert response processor 1450. The user interface further comprises a plurality of servers 1460a-n each of which includes at least one display and a variety of input/output devices such as keyboards, mice, etc. Details of servers 1460 are set forth in FIG. 13. The servers are connected to an applications server 1470 that receives from servers 1460a-n inputs from the users in the form of search or alert criteria. Servers 1460 a-n are connected to alert response processor 1450. Application server 1470 is connected to alert matcher 1440. Further details about these elements are set forth below in the discussion of their operation.

Before attempting to match the alert request with classifier output, the classifier output is first expanded. At combination generator 1422 in expander 1420, for each message set from the classifier that has not yet been expanded, a calculation is made of appropriate conjunctive combinations of the topic group IDs that are associated with the classified message set. In general, those combinations of topic group IDs are appropriate where the product of the relevancies of the topic groups is at least 60%. The topic group IDS from the classifier and the appropriate combinations of topic group IDs are then stored in the database as possible descriptors for the message set. At alert aggregator 1424 in expander 1420, for each combination of topic group IDs that has been stored in the previous combination generating step, for one or more message sets in the same time bucket, the total volume, volume weighted average sentiment, and volume weighted average relevancy values are also calculated from the respective volume/relevancy/and sentiment values for the constituent message sets labeled with a given topic group combination by expander 1420.

Next, alert matcher 1440 receives from application server 1470 a topic group request that originated from one or more users at one or more application servers 1460 a-n. Matcher 1440 determines at step 1450 if the request can be satisfied from cache 1430 or if it is necessary to query the database. If it is necessary to query the database, the results are loaded into the cache at step 1460. At step 1470 the topic group request is matched against the contents of the cache. In addition, for each interval duration, values are calculated for volume and sentiment for the matched results. At step 1480, response processor 1450 then reports the results of the match to the servers that originated the topic group request.

FIGS. 15A-15L depict a series of illustrative screens used in the graphical user interface of system 200. In particular, the screens are displayed on terminals 290, 292, and/or 294. The screens have substantially the same format with a header 1510, an alert space 1530 and a work space 1550 available on most of the careens. Header 1510 includes soft keys 1512, 1514, 1516, and 1518 for accessing search (FIG. 15G), alert (FIG. 15E), history (FIG. 15H) and account (FIG. 15A) screens that are described below; a soft key 1522 for accessing a settings screen (FIG. 15D), a soft key 1524 for logging out and a welcome line 1528 that identifies the individual who is signed on at the terminal displaying the screens.

Alert space 1530 provides a continuously updated table 1532 that summarizes any alerts that the user may have requested from the system. In the illustrative screens of FIGS. 15A to 15L, these alerts are identified in the four rows of a first column 1533 of the table as "Oil Portfolio," "Pharma [Pharmaceutical] Portfolio," and "Constr [Construction] Portfolio," and "Oil Portfolio." The remaining columns 1534-1539 specify in each row the sentiment value (up or down arrows)

and topic 1534 for text messages associated with the alert identified in the corresponding row in column 1533; the subject matter 1535 of the alert, the virality 1536 of the associated text messages, notes 1537 about the alert, the relevance 1538 of the text messages and the date and time 1539 of the last update for the alert. The user may click on any alert identified in the report; and additional information will be provided in the form of the screen shown in FIG. 15J.

Headers 1510 and alert spaces 1530 are the same on every screen where they are used. The content of the work space 1550 varies from screen to screen as described below. Advantageously, the user can select the screens on which the alert space is displayed.

Figure 15B:
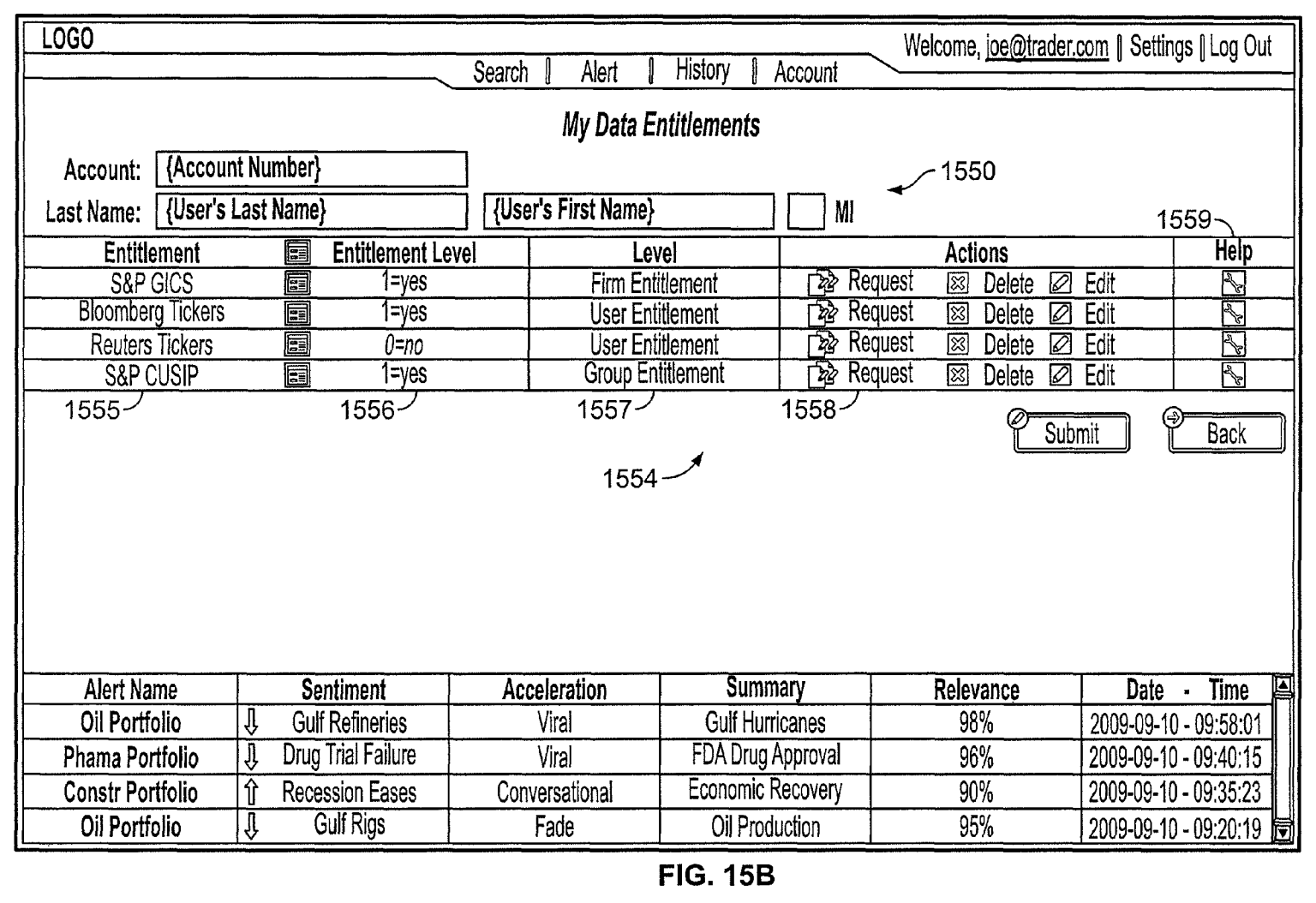

FIGS. 15A and 15B depict MainAccounts and MainAccountsEntitlements screens. The MainAccounts screen enables entry and display of the user's name, address, contact information, and password. It also associates the user with a particular account and the firm name and group name for that account. A soft key 1552 provides access to the MainAccountsEntitlement screen; and a soft key 1553 provides for deletion of the information in selected fields.

The MainAccountsEntitlement screen provides for control of the user's data entitlements. Work space 1550 provides for identification of the user by name and account number. A table 1554 of five columns 1555 to 1559 and multiple rows summarize the user's data entitlements with respect to several data sources that are listed in the rows. The multiple rows in column 1555 identify particular data sources such as "S&P GICS." The rows of column 1556 indicate whether the user has access to data from the data source identified in the same row in column 1555. The rows of column 1557 indicate where the user may exercise that entitlement. The rows in column 1558 indicate what actions (request, delete, edit) the user may take with respect to the data. And the rows in column 1559 enable the user to request assistance with respect the data source identified in the same row in column 1555.

FIG. 15C depicts the MainLogin screen. Work space 1550 on this screen asks for the user's account number and password. A Log In soft key 1561 allows the user to complete the log in process. A My Account soft key 1562 allows the user to access the MainAccounts screen of FIG. 15A. A Contact Us soft key 1563 allows the user to enter a request that he/she be contacted. A Lost Password soft key 1564 allows the user to access a password recovery process (not shown). The standard report space 1530 is not used on the MainLogin screen since this screen may be displayed to individuals other than logged in users.

FIG. 15D depicts the MainSettings screen. Work space 1550 for this screen includes an alert criteria selection box 1571 and a relevancy & thresholds selection box 1575 that allow the user to specify alert criteria, relevancy and thresholds. Illustratively, the sample interval may be selected in alert criteria selection box 1571 from intraday, interday, weekly, quarterly, semiannual or annual time periods. Different sampling intervals may be applied to different portfolios by scrolling through a list 1573 of pending alerts and clicking on the alert(s) to which a selected sample interval is to apply. In selection box 1575, minimum relevancy may be selected from a set 1576 of choices including low (60% to 80%), medium (80% to 90%), high (90% to 95%) and very high (95% to 100%). Sentiment threshold may be selected from seven categories 1577 ranging from very positive to very negative; and buzz (or volume) level may be selected in terms 1578 of low, medium or high degree of difference from norm.

Figure 15E:
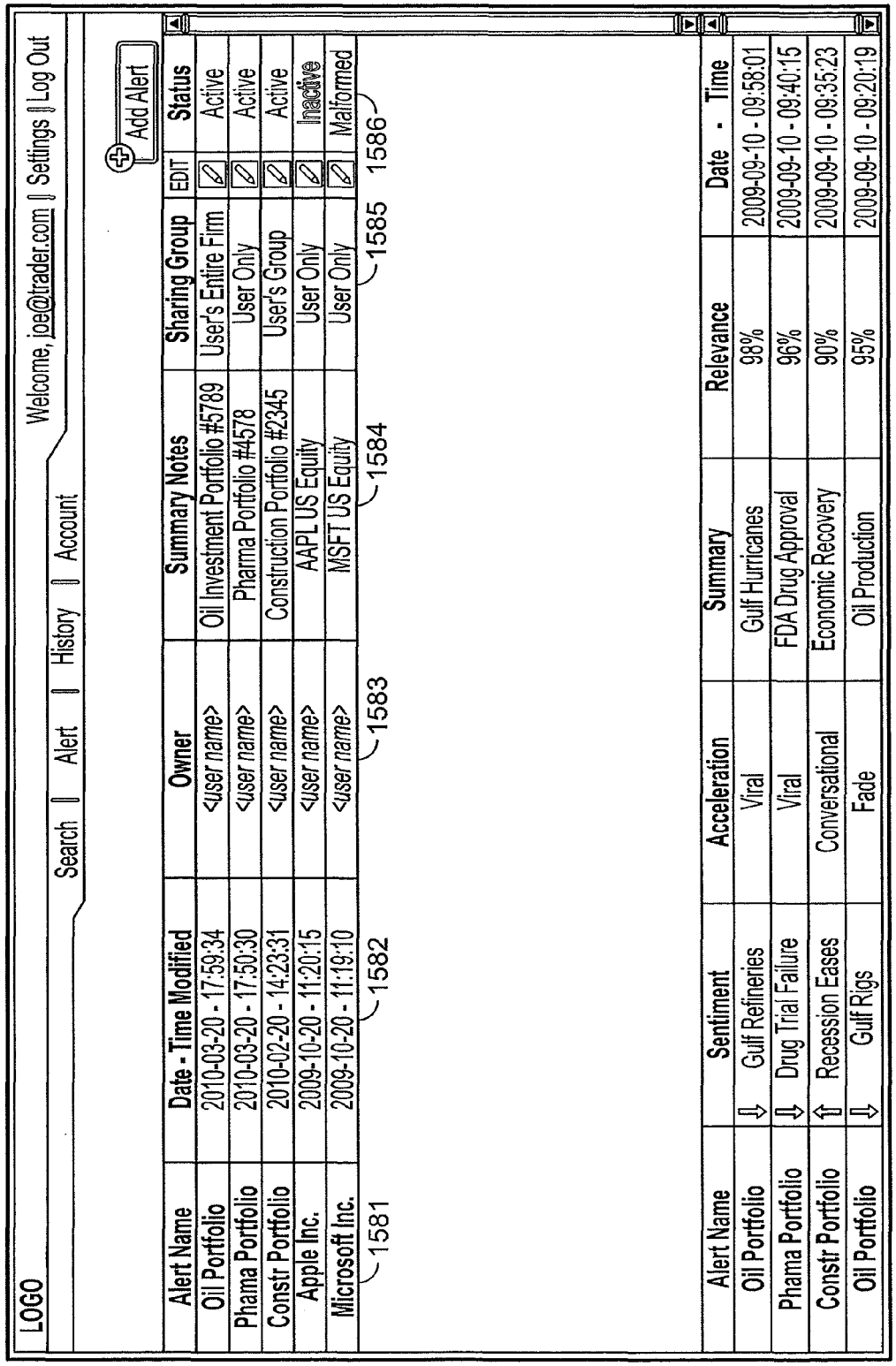

FIGS. 15E, 15F and 15G depict the MainAlert, MainAlertEntryEdit, and MainEntry screens. In FIG. 15E the work space 1550 depicts a table of all previously issued alerts for the user of the screen. Six columns 1581-1586 of the table identify the alert name 1581, the date and time 1582 the alert was last modified, the owner 1583 of the alert, notes 1584 concerning the alert, the identity 1585 of those with whom the alert is shared, and the status 1586 of the alert.

Work space 1550 of FIG. 15F enables a user to enter alert criteria by navigating through the financial taxonomies stored in the knowledge base stored in database 270. Specifically, the left-hand column in workspace 1550 depicts a portion of a GICS taxonomy relating to energy topics. The middle column depicts an illustrative example of the high level taxonomies for the entire knowledge base. And the right-hand side provides for entry of comments using a first typing window and a submit key and for the retrieval of spreadsheets identified by typing their name in a second typing window. Spreadsheets provided for upload via the second typing window cause the generation of a series of alerts, provided the format of the spreadsheet corresponds to predefined specification of lists of tickers.

Work space 1550 of FIG. 15G provides for quick entry of search criteria Softkeys 1591, 1592 and 1593 labeled Advanced, Research and Help provide access to additional resources. A first scroll key 1594 allows the user to scroll among various taxonomies sources such as Bloomberg Tickers (as shown), Reuters Tickers, etc.; and a scroll bar 1596 allows the user to select among the various suggested continuations of partial text entered in the Search Box.

Figure 15I:
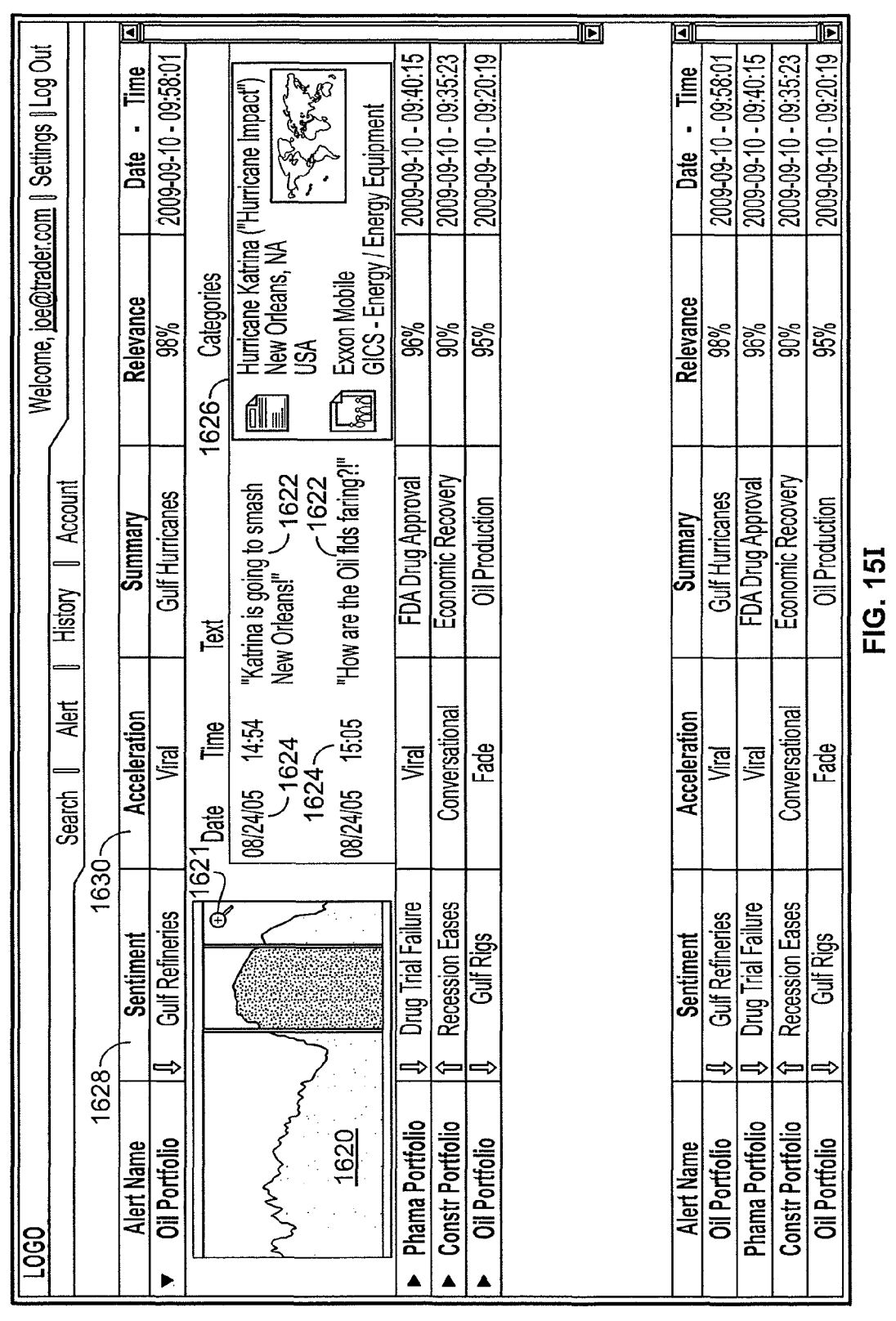
Figure 15J:
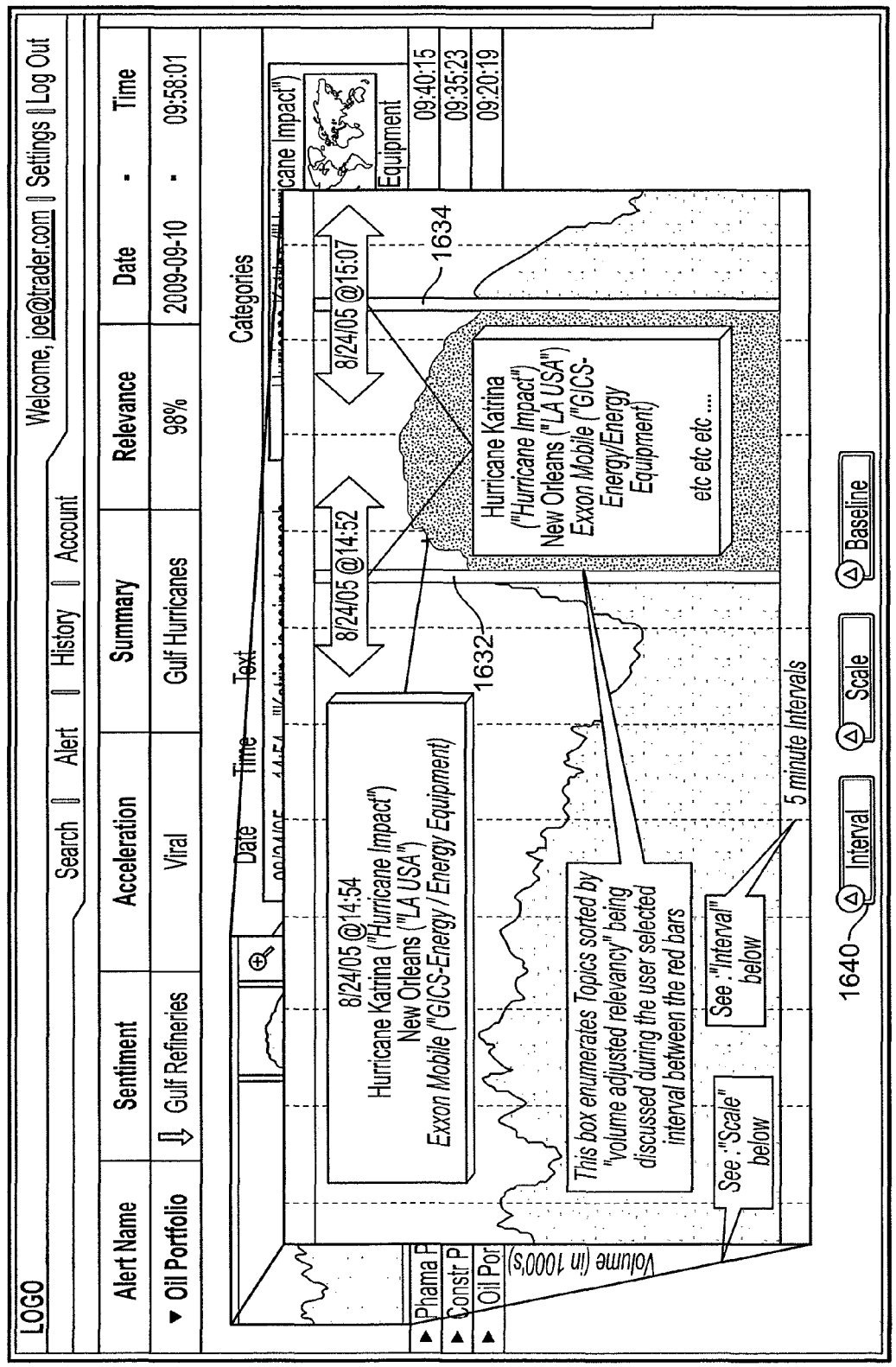

FIGS. 15H, 15I and 15J provide for the display of results. Work space 1550 of FIG. 15H displays a table 1610 setting forth the results for all pending alerts. The contents of this table are the same as the contents of the report space 1530 however, the results displayed in table 1610 are updated in real time as new alert responses are received by the GUI, while the contents of report space 1530 represent a snapshot in time.

When the user clicks on a particular alert in the table 1610 presented in work space 1550 of FIG. 15H, a screen such as that of FIG. 15I is presented displaying additional information about the selected alert. Illustratively, this information includes a graph 1620 that depicts the changing volume of messages relating to the alert topic, the text 1622 of several messages relating to the topic along with the date and time 1624 they were received, and the highest relevancy ranked topic categories 1626 in addition to the alert topic. The sentiment level 1628 and virality 1630 continue to be displayed.

The graph of FIG. 15I can be magnified by clicking on a magnifying glass 1621 in the upper right corner of the graph to produce a screen such as that depicted in FIG. 15J. This screen provides for interaction with the user to adjust the graphic display. For purposes of illustration the graphic display is divided into 5 minute intervals. The user can change this by clicking on an interval key 1640 at the bottom of the workspace which will cause the monitor to display the screen of FIG. 15K. FIG. 15K displays an interval selection box 1650. The interval duration can be changed by clicking on a different interval in box 1650 and then clicking on a redraw softkey 1652 at the bottom of the work space. This returns the display to that of FIG. 15J but with the newly selected time interval. Similarly scale and interval can be changed by interacting with drag-able scroll bars at the base of the magnified region.

Figure 15L:
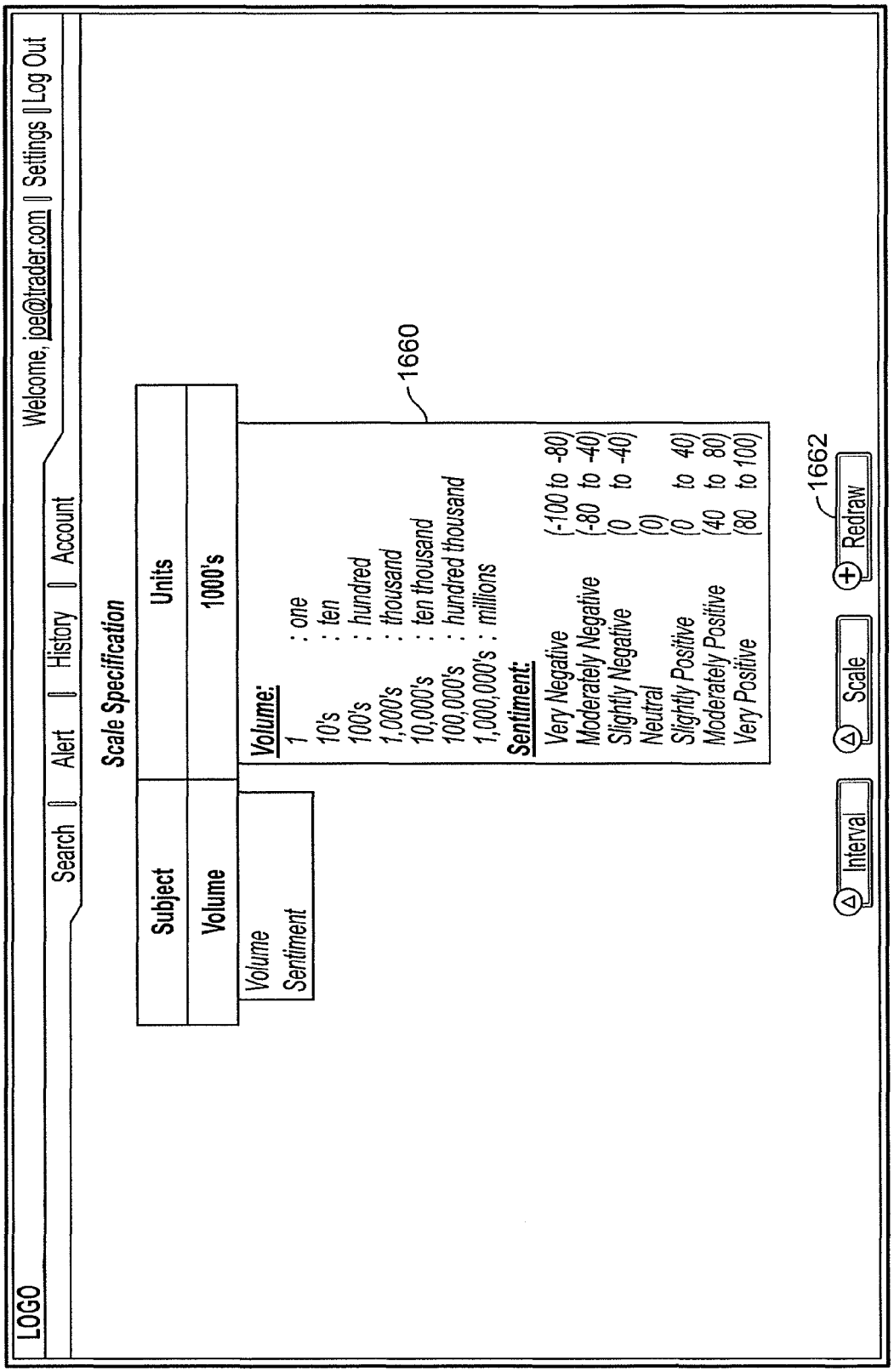
FIG. 15L is a depiction of a first illustrative scale specification display screen used in the practice of the invention.

For purposes of illustration, FIG. 15J plots volume of messages on the vertical axis in units of 1000's. This scale can be changed by clicking on the scale key at the bottom of the workspace which will cause the monitor to display the screen of FIG. 15L. FIG. 15L displays a scale selection box 1660. The scale can be changed by clicking on a different scale in box 1660 and then clicking on a redraw softkey 1662 at the bottom of the workspace. This returns the display to that of FIG. 15J but with the newly selected scale.

Two vertical bars 1632, 1634 in the display screen of FIG. 15J define a 15 minute time period from which will be drawn the text messages 1622 that are displayed on the workspace of FIG. 15I and over which will be made the calculation of volume adjusted relevancy. These bars can be moved laterally by clicking on them and dragging so as to change the time period encompassed within the two bars.

Figure 15M:
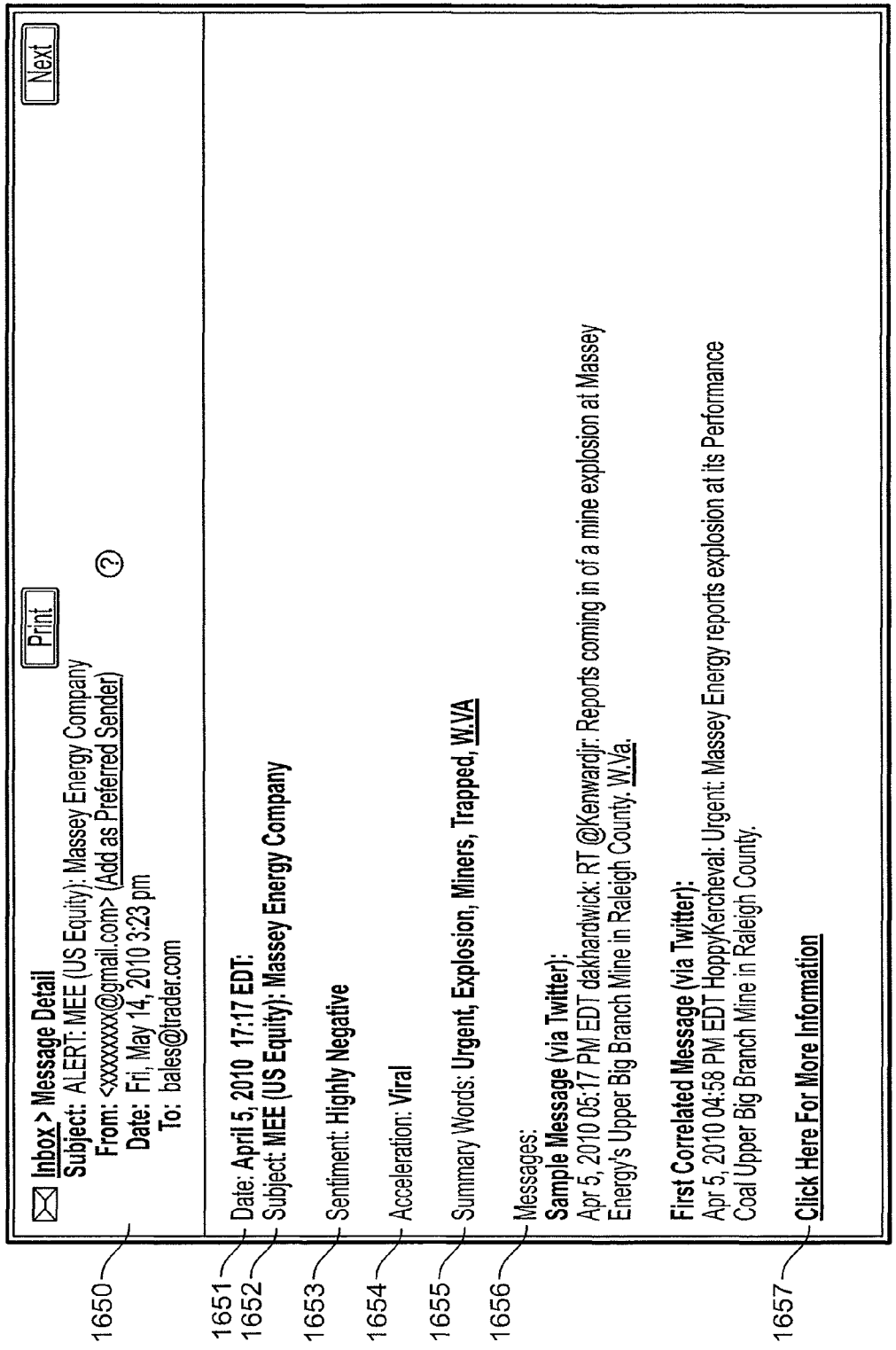
FIG. 15M is a depiction of an illustrative email response for use in the practice of the invention.

FIG. 15M depicts an illustrative email response to an alert request. Header 1650 identifies the subject, the addressee, the date and the sender. Lines 1651 and 1652 identify the date and time of the alert request and the subject. Lines 1653 and 1654 state that text messages have been detected in response to this request that are highly negative in sentiment and viral in acceleration. As indicated above, both the assessment of the change in sentiment and the acceleration are made using similar equations that compare current sentiment levels and current activity levels with earlier sentiment levels and earlier activity levels. Line 1655 provides a selection of summary words that are extracted from the text messages based on the collection of words representing the highest term frequency IDF values in the set of messages on the basis of their relative frequency of use. A sampling of the text messages is provided at 1656. Finally a link is provided at line 1657 for quick access to more information such as additional text messages.

Example

The following illustrates a soft cluster formed from the arrival of messages during a one hour interval. The first grouping of soft clusters around seed token "aig", having local IDF 3.14457 with cluster density (overall pair-wise average cosine similarity) of 0.29051660 follows (note that the cosine similarity given is based on the term frequency IDF vector containing only the tokenized text of the messages processed, and the average cosine similarity is the pair-wise average cosine similarity between the given message and each other message of the soft cluster):

| Cluster Group | Message ID | Average Cosine Similarity | Timestamp | Message Text |
| --- | --- | --- | --- | --- |
| 40025 | 3451385 | 0.30905000 | 2010-03-01 00:55:00 | Prudential reportedly buying AIG Asian unit http://bit.ly/aEPTxe |
| 40025 | 3382089 | 0.38859700 | 2010-03-01 00:14:00 | London: AIG board approves $35.5 billion unit sale to Prudential http://www.askbiography.com/bio/London.html |
| 40025 | 3071391 | 0.24216200 | 2010-03-01 00:35:00 | World Finance: AIG and Pru close to $35bn Asian deal http://ow.ly/16GwRb |
| 40025 | 3276788 | 0.23175700 | 2010-03-01 00:40:00 | Okays AIG $23.4 billion in vendita a Prudential http://www.finanza24.org/Europa/okays-aig-%C2%A3-23-4-billion-in-vendita-a-prudential/ |
| 40025 | 2085773 | 0.35863700 | 2010-03-01 00:22:00 | RT @Reuters_Biz: AIG board approves $35.5 billion unit sale to Prudential http://link.reuters.com/sew82j |
| 40025 | 3788286 | 0.33560500 | 2010-03-01 00:22:00 | RT @equipment_lease: AIG board approves $35.5 billion unit sale to Prudential: NEWYORK (Reuters) 0 American Intern . . . http://bit.ly/aIadMm |
| 40025 | 2107266 | 0.24547700 | 2010-03-01 00:04:00 | Dear guy wearing AIG sweatshirt at Whole Foods: Is that supposed to be ironic? If not, can I have my money back please? |
| 40025 | 3652838 | 0.33699100 | 2010-03-01 00:34:00 | News: AIG board approves Asian life unit sale to Pru 0 Reuters http://bit.ly/bCTwgI |
| 40025 | 3193371 | 0.21237900 | 2010-03-01 00:16:00 | Sm bus peo I know do without health ins because too much money, then I think of AIG who pd billions in bonuses with our bailout money |
| 40025 | 2444654 | 0.24451100 | 2010-03-01 00:34:00 | #the_city AIG agrees to sell $35.5bn Asian assets to Prudential: Prudential has won the support . . . http://bit.ly/bxLUgn #finance #news #UK |

In this 2nd iteration of the overlap elimination process, the cluster density is increased to: 0.52881780

| Cluster Group | Message ID | Average Cosine Similarity | Timestamp | Message Text |
| --- | --- | --- | --- | --- |
| 40025 | 2085773 | 0.570014 | 2010-03-01 00:22:00 | RT @Reuters_Biz: AIG board approves $35.5 billion unit sale to Prudential http://link.reuters.com/sew82j |

-continued

| Cluster Group | Message ID | Average Cosine Similarity | Timestamp | Message Text |
|---|---|---|---|---|
| 40025 | 3382089 | 0.595946 | 2010-03-01 00:14:00 | London: AIG board approves $35.5 billion unit sale to Prudential-P- http://www.askbiography.com/bio/London.html |
| 40025 | 3451385 | 0.436637 | 2010-03-01 00:55:00 | Prudential reportedly buying AIG Asian unit http://bit.ly/aEPTxe |
| 40025 | 3652838 | 0.501185 | 2010-03-01 00:34:00 | News: AIG board approves Asian life unit sale to Pru- Reuters http://bit.ly/bCTwgI |
| 40025 | 3788286 | 0.540307 | 2010-03-01 00:22:00 | RT @equipment_lease: AIG board approves $35.5 billion unit sale to Prudential: NEWYORK (Reuters)-American Intern . . . http://bit.ly/aladMm |

The following is an example selection from the term frequency (TF)×inverted document frequency (IDF) vector for 2nd iteration cluster:

| Token | TF * IDF |
|---|---|
| prudential: | 12.41796, |
| approves: | 12.6286, |
| aig: | 15.72285, |
| unit: | 14.2957, |
| billion: | 8.44275, |
| asian: | 5.10776, |
| reuters: | 7.34148, |
| 35: | 7.41828, |
| sale: | 8.53416, |
| board: | 10.01516 |

The following is an example selection from the token dictionary at the 1 hour interval, which is a subset of the token dictionary pertinent to this particular soft cluster:

| Token Id | Token | IDF |
|---|---|---|
| 1286907 | okays | 4.32474 |
| . . . | | |
| 3087516 | vendita | 4.32474 |
| . . . | | |
| 505434 | sweatshirt | 3.81017 |
| 49870 | billions | 3.80659 |
| 694986 | pru | 3.79602 |
| 177640 | bonuses | 3.61878 |
| 14669 | reportedly | 3.50732 |
| 727020 | bailout | 3.46642 |
| 76648 | assets | 3.45347 |
| 23841 | #finance | 3.36530 |
| 60366 | agrees | 3.34753 |
| . . . | | |
| 106542 | ins | 3.31660 |
| 67338 | ironic | 3.30406 |
| . . . | | |
| 250816 | approves | 3.15715 |
| 212971 | aig | 3.14457 |
| 427486 | prudential | 3.10449 |
| . . . | | |
| 174326 | foods | 2.87795 |
| . . . | | |
| 1647 | finance | 2.84634 |
| 64994 | billion | 2.81425 |
| 43857 | asian | 2.55388 |
| 491 | buying | 2.51720 |
| 2004 | board | 2.50379 |
| . . . | | |
| 27808 | wearing | 2.34830 |
| 29783 | sell | 2.34044 |
| . . . | | |
| 3471 | american | 2.17898 |
| . . . | | |
| 22627 | sale | 2.13354 |
| 1616 | deal | 2.07188 |
| . . . | | |
| 11189 | health | 1.95904 |
| 4281 | support | 1.89209 |
| 937 | whole | 1.89209 |
| 11149 | link | 1.86923 |
| 2056 | without | 1.86332 |
| . . . | | |
| 1111 | life | 1.27875 |
| . . . | | |
| 915 | back | 1.07918 |

Modifications

While the invention has been described with reference to a specific embodiment, the invention may be practiced with numerous variations thereon. For example, while the specific embodiment describes a system and methods that process all micro-blog messages that are available to them, sampling techniques may be used to process only a fraction of the micro-blog messages that are available. The sampling techniques may be applied to sample the messages that are received at the intake to the system or they may be used at various stages in the processing of the micro-blog messages. It is contemplated that sampling techniques may also be used on an interim basis to accommodate changes in volume of the micro-blog message traffic or changes in availability of processing bandwidth.

Numerous variations may be practiced in input step 310. For example, different tokenizing rules and operations may be used. Frequently used words such as "the," "a," "an," "that" and various prepositions may be eliminated by the use of stopping procedures. Procedures that differ from the creation of a GLOBAL IDF table may be used to determine the importance of individual words and/or phrases. Other arrangements could be used to update the GLOBAL IDF table; and even a static GLOBAL IDF table based on standard word usage in the relevant language(s) could be used though a static table is not as likely to perform as well as one that is based on the words actually used in the text messages being processed. As noted previously, a variety of stemmers are available for use in the normalization step.

While the clustering process of FIG. 7 is preferred and appears to have advantages when processing short text messages such as tweets, other clustering procedures are known and may prove useful in the practice of the invention. Numerous variations may be practiced in selecting seed tokens for use in soft clustering. For example, instead of selecting the seed tokens from within a range of IDF values, the tokens may be all those tokens having an IDF value above a specified threshold. In some circumstances, it may be feasible to drop one or more of the clustering steps described in conjunction with FIG. 7. In other embodiments of the present invention, the document feature vector (DFV) may be expanded to include additional dimensions of metadata comprising:

- additions to the meta fields available from the source micro-blog platforms (e.g. author demographic information, social network graph connectedness, annotations added by author or by publishing application);
- additions of other implicit metadata based upon the source text message (e.g. extraction of a latitude-longitude pair for the geographical meta field based on the name of a geographical region within the body of the message, application of entity extraction methods prior to clustering, for the purposes of identifying entities mentioned in the text of the message comprising: people, locations, companies, products); or
- additions of syntactically identified information in the body of the text message (e.g. syntactic references indicating reply to a user account, syntactic indications of reposted messages, syntactic indications of embedded URL).

Again, while the processes for loading the knowledge base and generating classification rules there from are preferred, other loading techniques may be used and other procedures may be used to generate the classification rules. Similarly other procedures may be used for classifying the message sets.

Likewise, while the specific user interface described in conjunction with FIGS. 13, 14 and 15A-15M is preferred, numerous alternatives are also available.

System Architecture

Generally, the systems and methods described herein may be implemented, for example, via a secure Internet (e.g., secure rich online Internet) interface or a mobile/cellular connection/device (e.g., iPhone, Blackberry) interface. Data may be gathered in real time by licensing data from third party vendors or from other data sources. In addition, embodiments of the systems and methods may utilize, alone or in combination, any number of proprietary Web crawling and Web service APIs. Additional proprietary algorithms may be acquired to increase the possible number of consumer products.

Additional B2B Applications

Figure 16:
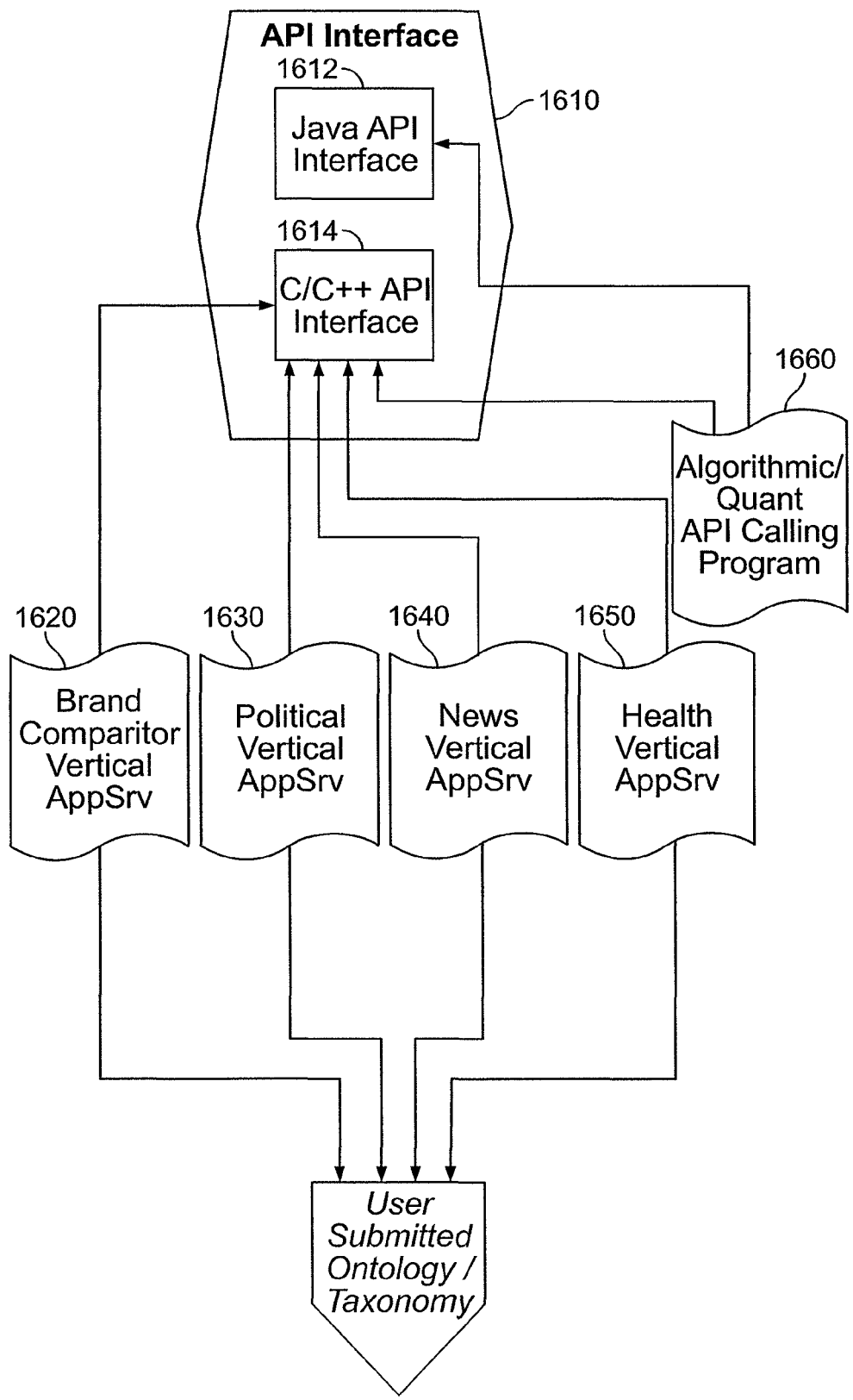
FIG. 16 is a schematic depicting an illustrative interface of the invention.

While the invention has been described in the context of a specific application of interest to the financial community, the invention may also be practiced in a variety of contexts, some of which are described below. Other exemplary B2B vertices may include without limitation:

- the finance market (e.g., institutional traders, futures traders, and all other finance areas);
- an API that enables quant funds to create customized investment models as shown in FIG. 16 Step 1660 where the systems Java API is utilized in Step 1612;
- product development tools for corporations (e.g., identify the type of products that people are most excited about in order to capitalize on consumer behavior trends when planning product creation);
- Investor Relations (e.g., monitoring all activity about a company of interest as a means to predict market movements and a sense of behavior of equity trading);
- Crisis and Disaster Management (e.g. monitoring public sentiment around a company-relevant disasters, such as an oil spill)
- HealthCare as shown in FIG. 16 Step 1650 where the systems C/C++API is utilized in Step 1614
- IT Advisory Services (e.g., alert IT researchers to the reception of their due diligence, and commentary related to technical areas of public recommendations produced; as well as product strategy approaches that are in vogue as well as the degree of public sentiment related to those areas of interest).
- the entertainment industry (e.g., monitor sentiment and activity surrounding film, television, music, and concert appearances);
- brand management tools as shown in FIG. 16 Step 1620 where the systems C/C++API is utilized in Step 1614 (e.g., manage changes in brand perception in real-time);
- celebrity/talent agencies (e.g., manage real-time reputation of performers and athletes);
- advertising and public relations (e.g., measure effectiveness of PR and ad products);
- real estate (e.g., monitor sentiment and activity around specific areas and neighborhoods, combining micro-content published from those areas and published information about those areas);
- travel industry (e.g., monitor shifts in sentiment and activity regarding various travel destinations and cities for potential use by consumers or travel companies);
- newspapers/blogs/news idea generation tools as shown in FIG. 16 Step 1640 where the systems C/C++API is utilized in Step 1614 (e.g., get a real-time sense of the type of news that people like to talk to about in order to generate ideas about the type of content to produce);
- transportation industry (e.g., monitor short-term sentiment and activity to better plan resource allocation);
- research firms (e.g., monitor real-time sentiment and activity trends for different demographic populations and different geo-graphical areas);
- political election tools (e.g., monitor real-time sentiment and activity shifts around candidates in ejections);
- e-commerce/commerce tools (e.g.•monitor activity around products and product launches; monitor "demonstration of purchase" of products);
- health tools (e.g., monitor the prevalence of sickness as it is expressed online); and
- customer service/online PR tools (e.g., identity negative sentiment around your brand ("'a fire' to be managed") or positive activity ("a flame to be increased"; sift through all customer feedback for changes in sentiment).

Additional B2C Applications

Exemplary B2C vertices include without limitation:
- iPhone/mobile applications (e.g., use "push alerts") to notify users when an athletic event is generating an abnormally high level of sentiment and activity; provide a way for fans to know "the best game currently happening"; decipher the "real-time mood of your vicinity," as a fun tool to guess "are people around me happy or sad today?"; depict the average mood of the physical place a user is in; geo-tagged user-published information from tweets/text messages from this location may be searched using sentiment algorithms well-known in the art);

- a real-time "happiness scale" website, including a worldwide "heatmap" of happiness;
- a real-time search engine that tracks items associated with search terms that are most positive in real-time sentiment and/or associated real-time online activity;
- a platform showing the top ten stock-affecting news sources;
- a consumer platform for product recommendations, showing the hottest commercial items in terms of real-time, user-generated sentiment and/or activity changes;
- a "consumer watch" platform that shows spikes in negative sentiment and activity around various products in real-time;
- a fashion platform that shows what the hottest clothes and clothing brands are in real-time based on real-time sentiment and activity volume;
- an entertainment evaluation platform (Real-time Rotten Tomatoes/Metacritic); and
- an online newspaper/blog of the ten most-loved and most-hated things on the web today Additional Macro Embodiments Employing at least some of the algorithms described above, with reference to one or another embodiment of the present disclosure, some embodiments may include a "daily happiness scale," for example, that takes into account sentiment across all user-published information for the country of the user and/or, similarly, a world happiness scale. Some embodiments may include a "daily activity scale" that shows days of abnormally high online activity and abnormally low online activity. This "daily activity scale" may be utilized, by way of example only, in the context of (i) macro-sentiment shifts (for countries) visually overlaid with stock market reference points, including but not limited to the Dow Industrial Average and the NASDAQ for the United States; (ii) real-time sensitive daily lists of the ten "most-loved" and "most-hated" equities; (iii) real-time sensitive lists of the ten "most buzzed about" companies; (iv) real-time ranking lists of the most "happy" and "sad" countries throughout the world; or (v) real-time sensitive lists of the "ten most active sectors." In addition, some embodiments may provide a "build your own macro trend" capability, using all the available fields of search. This enables traders to set the macro-tools that are most specific to their needs.

Additional Tools

According to some embodiments, each "seat" (i.e., system) may have a built-in Twitter like micro-blogging platform through which users may provide feedback or suggestions with respect to troubleshooting and/or improving system operation and performance. Through this feature, continued refinement of the user interface to meet user needs is possible. This feature may also create a direct interactive dialogue between users and system administrators.

Additional Embodiment Genres

Some embodiments may contain algorithms created to show "intent to purchase" or "the act of purchasing" as expressed within micro-published information. Words and phrases commonly associated with purchasing, such as "I really want" and "I just bought," can be searched for in real time and in proximity to a company name and/or a company's products.

Additional potential technology vertices include Internet-enabled television platforms and interactive television, digital signage products that evolve and move in real time creating large scale info-scapes for public places and real-world, real-time sensitive projection products, including without limitation out-of-home projects, stadium projects, and in-the-house "poster like" projects.

As noted at least with respect to some embodiments, well known algorithms for data mining of published information may be used with one or more of the disclosed embodiments. One of ordinary skill in the will also appreciate that other proprietary algorithms may be included and used for some embodiments of the present disclosure, and that the present disclosure also either expressly or inherently discloses algorithms which may constitute at least some embodiments of the disclosure, or may be used with one or more of the disclosed embodiments.

Accordingly, the present disclosure presents exemplary embodiments of the devices, systems and methods for determining activity and/or sentiment of consumers, groups and/or companies and the like. As noted elsewhere, these embodiments have been described for illustrative purposes only and are not limiting. Other embodiments are possible and are covered by the inventions disclosed herein. Such embodiments will be apparent to persons of ordinary skill in the relevant art(s) based on the teachings contained throughout the disclosure. Thus, the breadth and scope of the disclosure should not be limited by any of the above-described embodiments.

What is claimed is:

1. A method of analyzing micro-blog activity to detect emerging and viral events comprising:
    examining a plurality of received micro-blog messages to predict an effect on society of a single event described in each micro-blog message included in a subset of micro-blog messages, wherein the subset of micro-blog messages comprises a plurality of micro-blog messages contained in the plurality of received micro-blog messages;
    forming a prediction about the effect on society of the single event described in each of the micro-blog messages contained in the subset of micro-blog messages; and
    alerting a user when the predicted effect exceeds a threshold.

2. The method of claim 1 further comprising:
    determining a set of features about the plurality of received micro-blog messages and senders of the micro-blog messages;
    clustering the plurality of received micro-blog messages based on the set of features to create the subset of micro-blog messages that represent the single event; and
    classifying the event to form a prediction about the effect on society of the event.

3. The method of claim 1, wherein the plurality of received micro-blog messages are received using a web application server and the received micro-blog messages are stored into a database.

4. The method of claim 3, wherein the plurality of received micro-blog messages are received by accessing applications programming interfaces for one or more micro-blog platforms.

5. The method of claim 1, wherein the examining step includes parsing the plurality of received micro-blog messages to form word vectors, wherein the word vectors are vectors of one or more words.

6. The method of claim 5, wherein the examining step further includes identifying metadata associated with each micro-blog message contained in the plurality of received micro-blog messages.

7. The method of claim 6, wherein the metadata associated with each received micro-blog message includes at least one of geographic information about the micro-blog message, information about user generating the micro-blog message, and information specifying the time the user generated the micro-blog message.

8. The method of claim 6, wherein the examining step further includes developing one or more classifiers from one or more training sets and applying the one or more classifiers to the word vectors and the metadata associated each micro-blog message contained in the plurality of received micro-blog messages.

9. The method of claim 8, wherein the examining step further includes processing the plurality of received micro-blog messages to form a clustered set of messages having similar word vectors and similar metadata.

10. The method of claim 9, wherein the examining step further includes:
    generating from a knowledge base a set of classification rules that specify a probability that a clustered set of messages is related to a topic in the knowledge base;
    generating an index to the classification rules using as the source of the index the word vectors and metadata in the topic properties of the knowledge base and their associated rules;
    using the index to the classification rules to identify rules that relate to the word vectors and metadata;
    retrieving the identified rules; and
    applying the identified rules to sets of micro-blog messages to from the subset of micro-blog messages describing the single event.

11. The method of claim 1, wherein the examining step comprises comparing the volume of micro-blog message traffic relating to the single event in a current time interval with the volume of micro-blog message traffic relating to the single event in at least one earlier time interval.

12. The method of claim 1, wherein the examining step comprises comparing a level of sentiment in micro-blog message traffic relating to the single event in a current time interval with a level of sentiment in micro-blog message traffic relating to the single event in at least one earlier time interval.

13. A method for detecting and communicating emerging and viral events identified in micro-blog activity comprising:
    receiving a plurality of micro-blog messages by accessing one or more micro-blog applications programming interfaces using a web application server;
    examining the plurality of received micro-blog messages by:
        clustering received micro-blog messages based on the contents of the messages and/or metadata associated with the messages;
        classifying the clusters of received micro-blog messages using a set of classification rules derived from a knowledge base; and
        identifying clusters of received micro-blog messages describing a single event;
        clustering the identified clusters of received micro-blog messages describing the single event to form a subset of micro-blog messages wherein each micro-blog message in the subset of micro-blog messages describes the single event;
    forming a prediction about an effect on society of the single event based on a set of rules; and
    alerting a user when the prediction exceeds a threshold.

14. The method of claim 13, wherein the step of clustering received micro-blog messages includes parsing the micro-blog messages to form vectors of one or more words.

15. The method according to claim 13, wherein the classifying step further includes deriving the classification rules from a set of ontologies and/or taxonomies stored in the knowledge base.

16. The method according to claim 13, wherein classifying step further includes specifying a probability that a clustered set of received micro-blog messages is related to a topic defined in the knowledge base.

17. The method of claim 13, wherein the predicting step includes comparing the volume of micro-blog messages in a cluster relating to the single event in a current time interval with the volume of micro-blog messages in a cluster relating to the single event or a similar event in at least one earlier time interval.

18. The method of claim 13, wherein the predicting step includes comparing a level of sentiment in a cluster of micro-blog messages relating to the single event in a current time interval with a level of sentiment in a cluster of micro-blog messages relating to the single event or a similar event in at least one earlier time interval.

19. A system for detecting and communicating emerging events from micro-blog activity comprising:
    a computer system for acquiring a plurality of micro-blog messages related to a single event comprising:
        a server for receiving micro-blog messages; and
        a database for examining the received micro-blog messages to identify micro-blog messages relating to the single event;
    a computer system for predicting an effect on society of the single event based on the micro-blog messages related to the single event; and
    a computer system for alerting a user when the predicted effect reaches a threshold.

20. The system according to claim 19, wherein the computer system for examining the received micro-blog messages to identify micro-blog messages related to the single event comprises:
    a clusterer for grouping received micro-blog messages based on the contents of the messages and/or data associated with the messages;
    a classifer for classifying the grouped micro-blog messages; and
    a knowledge base for identifying a group of micro-blog messages related to the single event based on the classification of the grouped micro-blog messages.

21. The system according to claim 19, wherein the computer system for predicting the effect on society of the single event based on the micro-blog messages related to the single event comprises a database for comparing the volume of micro-blog messages in a cluster relating to the single event in a current time interval with the volume of micro-blog messages in a cluster relating to a similar event in at least one earlier time interval.

22. The system according to claim 19, wherein the computer system for predicting the effect on society of the single event based on the micro-blog messages related to the single event comprises a knowledge base for comparing a level of sentiment in a cluster of micro-blog messages relating to the single event in a current time interval with a level of sentiment in a cluster of micro-blog messages relating to a similar event in at least one earlier time interval.

23. The method of claim 1, wherein the prediction is associated with a time period.

24. The method of claim 1, wherein the prediction is associated with a movement of a marketplace.

25. The method of claim 1, wherein the prediction relates to a change in sentiment.

* * * * *